US009460584B2

(12) United States Patent
Barclay et al.

(10) Patent No.: US 9,460,584 B2
(45) Date of Patent: Oct. 4, 2016

(54) CONTROLLING WAGERING GAME PLAY CONTINUATION

(75) Inventors: Brian J. Barclay, Atlanta, GA (US); Andrew C. Guinn, Henderson, NV (US); Richard B. Robbins, Glenview, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 622 days.

(21) Appl. No.: 13/499,127

(22) PCT Filed: Apr. 11, 2011

(86) PCT No.: PCT/US2011/031952

§ 371 (c)(1),
(2), (4) Date: Mar. 29, 2012

(87) PCT Pub. No.: WO2011/130172

PCT Pub. Date: Oct. 20, 2011

(65) Prior Publication Data

US 2012/0184349 A1 Jul. 19, 2012

Related U.S. Application Data

(60) Provisional application No. 61/322,968, filed on Apr. 12, 2010.

(51) Int. Cl.
*G06F 17/00* (2006.01)
*G07F 17/32* (2006.01)

(52) U.S. Cl.
CPC ......... *G07F 17/3281* (2013.01); *G07F 17/323* (2013.01); *G07F 17/3204* (2013.01)

(58) Field of Classification Search
CPC .................................................. G07F 17/3269
USPC .................................. 463/17, 25, 29, 40, 42
See application file for complete search history.

(56) References Cited

U.S. PATENT DOCUMENTS 6,216,122 B1 * 4/2001 Elson
6,676,514 B1 1/2004 Kusuda et al.
(Continued)

FOREIGN PATENT DOCUMENTS

WO WO-2011130172 3/2011

OTHER PUBLICATIONS

"PCT Application No. PCT/US11/31952 International Preliminary Report on Patentability", Oct. 26, 2012 , 5 pages.
(Continued)

*Primary Examiner* — Pierre E Elisca
*Assistant Examiner* — Carl V Larsen
(74) *Attorney, Agent, or Firm* — DeLizio Law, PLLC

(57) ABSTRACT

A wagering game system and its operations are described herein. In embodiments, the operations can include a recording of a first wagering game content from a first wagering game played during a wagering game session and generating an electronic (e.g., an "e-mail") message, after the wagering game session ends. The operations can also include embedding in the electronic message an object that provides access to a second wagering game content. The second wagering game content includes a recording of the first wagering game. The operations can further include sending the electronic message to an electronic address for a wagering game player account associated with the wagering game session, and detecting access to the second wagering game content, via the electronic message. The second wagering game content can re-present the portion of the first wagering game content as part of the second wagering game content.

21 Claims, 10 Drawing Sheets

(56) References Cited

U.S. PATENT DOCUMENTS

| | | | | |
|---|---|---|---|---|
| 2002/0061778 | A1* | 5/2002 | Acres | 463/40 |
| 2002/0138342 | A1* | 9/2002 | Clark et al. | 705/14 |
| 2003/0220133 | A1* | 11/2003 | Walker et al. | 463/20 |
| 2004/0127279 | A1* | 7/2004 | Gatto et al. | 463/17 |
| 2004/0204230 | A1 | 10/2004 | Kazama et al. | |
| 2007/0010309 | A1 | 1/2007 | Giobbi et al. | |
| 2007/0259709 | A1* | 11/2007 | Kelly et al. | 463/20 |
| 2007/0266115 | A1* | 11/2007 | Levin | 709/217 |
| 2007/0270202 | A1* | 11/2007 | Vostoris | 463/16 |
| 2008/0085769 | A1* | 4/2008 | Lutnick et al. | 463/41 |
| 2008/0146322 | A1* | 6/2008 | Hardy et al. | 463/25 |
| 2008/0300061 | A1* | 12/2008 | Zheng | 463/42 |
| 2009/0247259 | A1 | 10/2009 | Napolitano | |
| 2010/0062840 | A1* | 3/2010 | Herrmann | 463/25 |

OTHER PUBLICATIONS

"PCT Application No. PCT/US11/31952 International Search Report", Jun. 21, 2011 , 6 pages.

* cited by examiner

CONTROLLING WAGERING GAME PLAY CONTINUATION

RELATED APPLICATIONS

This application claims the priority benefit of U.S. Provisional Application Ser. No. 61/322,968 filed Apr. 12, 2010.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

TECHNICAL FIELD

Embodiments of the inventive subject matter relate generally to wagering game systems and networks that, more particularly, control wagering game play continuation.

BACKGROUND

Wagering game machines, such as slot machines, video poker machines and the like, have been a cornerstone of the gaming industry for several years. Traditionally, wagering game machines have been confined to physical buildings, like casinos (e.g., resort casinos, road-side casinos, etc.). The casinos are located in specific geographic locations that are authorized to present wagering games to casino patrons. However, with the proliferation of interest and use of the Internet, shrewd wagering game manufacturers have recognized that a global public network, such as the Internet, can reach to various locations of the world that have been authorized to present wagering games. Any individual with a personal computing device (e.g., a personal computer, a laptop, a personal digital assistant, a cell phone, etc.) can connect to the Internet and play wagering games. Consequently, some wagering game manufacturers have created wagering games that can be processed by personal computing devices and offered via online casino websites ("online casinos"). However, online casinos face challenges and struggles. For instance, online casinos have struggled to provide the excitement and entertainment that a real-world casino environment provides. Some online casinos have struggled enforcing cross-jurisdictional restrictions and requirements. Further, some online casinos have struggled adapting the online gaming industry to a traditionally non-wagering game business environment. As a result, wagering game manufacturers, casino operators, and online game providers are constantly in need of innovative concepts that can make the online gaming industry appealing and profitable.

SUMMARY

In some embodiments, a computer-implemented method comprises recording a first wagering game content from a first wagering game played during a wagering game session; generating an electronic message, after a period of time after the wagering game session ends; embedding in the electronic message an object that provides access to a second wagering game content, wherein the second wagering game content includes a recording of the first wagering game content; sending the electronic message to an electronic address for a wagering game player account associated with the wagering game session; and detecting access to the second wagering game content, via the object embedded in the electronic message, wherein the second wagering game content re-presents the first wagering game content as part of the second wagering game content.

In some embodiments, the object that provides access to the second wagering game content is a link, and wherein detecting access to the second wagering game content, via the object embedded in the electronic message, comprises: detecting a selection of the link; launching an instance of a web browser in response to the detecting the selection; and presenting the second wagering game content in the instance of the web browser.

In some embodiments, recording the first wagering game content comprises presenting a first value on one or more first wagering game elements during the first wagering game according to a randomly generated number, wherein the first value reveals a first part of a wagering game outcome in the first wagering game; presenting a second value on one or more second wagering game elements during the first wagering game, wherein the second value reveals a second part of the wagering game outcome, and wherein the first value combined with the second value collectively present a losing wagering game outcome; and recording an image of the first value.

In some embodiments, embedding in the electronic message the object that provides access to the second wagering game content includes generating a wagering game animation that includes the image of the first value, an instance of the one or more second wagering game elements, and a control to activate a replaying of the second part of the wagering game outcome on the instance of the one or more second wagering game elements using an additional randomly generated number, and embedding the wagering game animation within a body of the electronic message.

In some embodiments, detecting access to the second wagering game content, via the object embedded in the electronic message comprises detecting access to the electronic message via a client device that is configured to present the wagering game animation in the electronic message, and detecting activation of the control by user input via the client device.

In some embodiments, the computer-implemented method further comprises detecting presentation of a third value, based on the additional randomly generated result, wherein the presentation of the third value is on the instance of the one or more second wagering game elements during the second wagering game second; and detecting that the third value, combined with the first value, collectively present a winning wagering game outcome.

In some embodiments, recording the first wagering game content comprises, presenting slot reels with face values that align in a sequence along a payline to reveal a wagering game outcome for the first wagering game according to a first randomly generated number, wherein the face values include a first value on a first part of the slot reels to begin the sequence and a second value on a second part of the slot reels to end the sequence, determining that the first value would, if combined with a specific face value for the second value, result in a winning slot-reel-sequence configuration, determining that the second face value is not the specific face value, capturing a representation of the first value, and generating the second wagering game content to include the representation of the first value, a representation of the second part of the slot reels without the second value, and a control to spin only the representation of the second part of the slot reels to generate a third value according to a second randomly generated number.

In some embodiments, the computer-implemented further comprises embedding one or more betting controls within the electronic message; detecting a wager amount via the one or more betting controls for the second wagering game content; and transacting a wager using the wager amount.

In some embodiments, one or more machine-readable storage media having instructions stored thereon, which when executed by a set of one or more processors causes the set of one or more processors to perform operations comprises: detecting a presentation of a first wagering game outcome for a first wagering game content played during a wagering game session, wherein the presentation of the first wagering game outcome includes a first wagering game element and a second wagering game element, wherein the first wagering game element depicts a first outcome value, and wherein the second wagering game element depicts a second outcome value; determining that the wagering game session ends; determining that a period of time has passed after the wagering game session ends; creating a second wagering game content, wherein the second wagering game content includes a depiction of the first outcome value, wherein the second wagering game content also includes a third wagering game element, and wherein the third wagering game element can be activated for play in the second wagering game content; embedding the second wagering game content in an electronic mail message; sending the electronic mail message, after the period of time, to an electronic address for a wagering game player account associated with the wagering game session; detecting activation of the third wagering game element for play via user input from the electronic mail message; generating a third outcome value in response to the activation of the third wagering game element, wherein the third outcome value is different from the second outcome value; providing the third outcome value to the second wagering game content to present on the third wagering game element; and generating a second wagering game outcome for the second wagering game content using the first outcome value and the third outcome value.

In some embodiments, the third wagering game element is a playable animation embedded within the body of the electronic mail message, wherein the animation initially presents a depiction of the second outcome value on the third wagering game element, and wherein the animation subsequently replaces the depiction of the second outcome value with a depiction of the third outcome value.

In some embodiments, the operations further comprise: determining that the second wagering game outcome is a winning outcome for the second wagering game content according to wagering game rules; requesting an online retailer to fund an award in response to the determining that the second wagering game outcome is a winning outcome, wherein the award is redeemable at a webpage for the online retailer; generating a link to the webpage; including the link in the second wagering game content; detecting selection of the link via the second wagering game content; and providing access to the webpage, via a web browser, in response to the detecting the selection of the link.

In some embodiments, the electronic address is for a social contact of a wagering game player account associated with the wagering game session.

In some embodiments, the operation for creating the second wagering game content further includes operations comprising: including a betting control within the second wagering game content; detecting an additional wager via the betting control; and transacting the wager in response to the detecting the activation of the third wagering game element.

In some embodiments, the first wagering game outcome is based on a first randomly generated number and wherein the operation for generating the third outcome value includes operations further comprising generating the third outcome value using a second randomly generated number.

In some embodiments, a system comprises: a continuation event detection module configured to detect, during a wagering game played during a wagering game session, a point from which to present a bonus game, via an electronic mail communication, after a wagering game session ends, embed content in an electronic mail message, wherein the content is configured to present the bonus game, and send the electronic mail message, after the wagering game session ends, to an electronic mail address associated with a wagering game player account that played the wagering game during the wagering game session; a wagering game continuation module configured to present the electronic mail message in an electronic mail client application, present the bonus game via the content, and present a winning result for the bonus game; and a marketing services module configured to determine that the bonus game obtains a winning result, determine a reward, and present an indication of the reward via the content.

In some embodiments, the wagering game continuation module is further configured to detect a selection of a social contact object associated with the electronic mail client application, wherein the social contact object represents a social contact of the player account, and forward the electronic mail message to a second electronic mail address associated with the social contact object, and wherein the marketing services module is further configured to detect use of the content by an additional wagering game player account associated with the second electronic mail address, and reward the first player account with a compensation for use of the content.

In some embodiments, the marketing services module is further configured to present marketing content in the electronic mail message for a subscriber account associated with the marketing services module, determine an award offered by the subscriber account, and provide the award as the reward.

In some embodiments, the wagering game continuation module is further configured to organize, automatically, the electronic mail message into electronic mail folders based on a game type for the wagering game.

In some embodiments, an apparatus comprises: a game continuation module configured to present wagering game elements of a wagering game on a comments application on a social networking website, capture a state of play of the wagering game elements from the comments application, generate a representation of the state of play, detect a selection, via user input, of a contact listed in the electronic communications application, create an electronic message with wagering game content that includes the representation of the state of play, send the electronic message to an electronic address associated with the contact, detect use of the representation of the state of play within the wagering game content to play a continuation of the wagering game, and award a wagering game player account for the use of the representation of the state of play to play the continuation of the wagering game.

In some embodiments, the game continuation module is further configured to fund a wager for the continuation of the wagering game from a money balance for the wagering game player account.

In some embodiments, the continuation of the wagering game is a group wagering game, and wherein the game continuation module is further configured to receive a reply electronic message from the electronic address, wherein the reply electronic message includes additional wagering game content related to the group wagering game.

In some embodiments, an apparatus comprises: means for receiving an electronic message that includes wagering game content that represents wagering game elements from a point in a state of play in a previously played wagering game; means for selecting the wagering game content from the electronic message; means for transferring the wagering game content from the electronic message to a wagering game toolbar in a web browser; means for controlling additional wagering game elements on the wagering game toolbar to continue playing the wagering game from the point in the state of play; means for detecting that the additional wagering game elements present a wagering game winning result; and means for providing an award to a wagering game player account associated with an electronic address included in the electronic message.

In some embodiments, the point in the state of play is immediately before a losing result occurred in the previously played wagering game, and wherein the means for transferring the wagering game content from the electronic message to the wagering game toolbar in the web browser further comprises means for presenting the additional wagering game elements as they appeared in the previously played wagering game immediately before the losing result.

In some embodiments, the means for controlling the additional wagering game elements on the wagering game toolbar further comprises, means for receiving instructions to control the additional wagering game elements based on randomly generated numbers from a wagering game server, and means for changing the appearance of the additional wagering game elements on the wagering game toolbar based on the instructions.

In some embodiments, the means for transferring the wagering game content from the electronic message to the wagering game toolbar in a web browser further comprises means for dragging and dropping a representation of the electronic message onto the wagering game toolbar.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

Social communication and social networking is on the rise. Internet users are enjoying a proliferation of social networking mechanisms (e.g., social networking websites, online chats, blogging, social networking applications, electronic mail or "e-mail," text messaging, etc.) that are appearing online in vast quantities. Many wagering game companies are discovering the value of integrating wagering games with social networking mechanisms. Some wagering game companies have created online wagering game websites that provide a way for wagering game enthusiasts to play wagering games while connected to the Internet (e.g., via a web-browser). Some of those online wagering game websites also provide social networks and social networking functionality. Social networks allow wagering game players ("players") to create social network user accounts with one or more unique identifiers that represent an online persona. One example of a unique identifier is an "avatar." Avatars are graphical, cartoon-like depictions of a social network persona. These online personas and associated avatars add to the fun of belonging to a social network. Furthermore, many social networking websites are expanding their capabilities to integrate with content providers, including wagering game providers. Thus, some online wagering game websites and some social networking websites are continually looking to integrate and/or incorporate each other's features.

Figure 1:
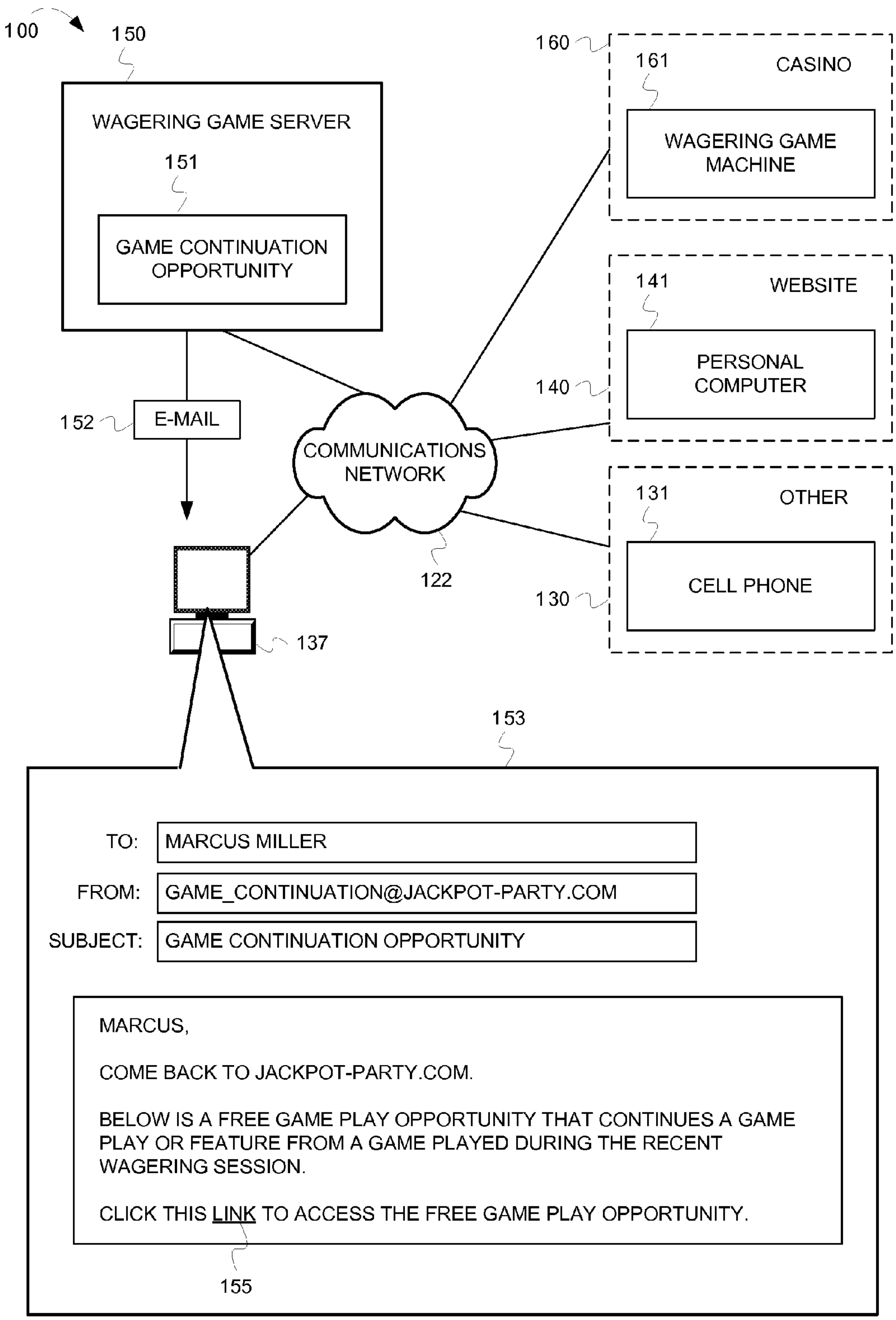
FIG. 1 is an illustration of providing wagering game play-continuation content from wagering game venues, according to some embodiments.

FIG. 1 is a conceptual diagram that illustrates an example of providing wagering game play-continuation content from wagering game venues, according to some embodiments. In FIG. 1, a wagering game system ("system") 100 includes a computer 137 connected to a wagering game server 150 via a communications network 122. The wagering game server 150 can be associated with one or more of different types of wagering game venues, such as a casino 160, an online gaming website 140, or other gaming venues 130. The wagering game server 150 can serve wagering game applications to devices in many different types of wagering game venues, such as a wagering game machine 161 in the casino 160, a personal computer 141 that accesses the online gaming website 140, a cell phone 131 that accesses games from the other gaming venues 130, or any combination or variation thereof. A user can utilize the devices (e.g., the wagering game machine 160, the personal computer 141, or the cell phone 131) to play wagering games using the wagering game applications during a wagering game session. For example, the user can log on to the wagering game server 150 using a wagering game player account ("player account") and can conduct wagers via the player account while playing the wagering games. The wagering game server 150 can detect, during the wagering game session, game events, such as wins, losses, bonus rounds, slot reel configurations, bets, etc. that occur in a first wagering game. The wagering game server 150 can record and store portions of, or events from, the first wagering game and use the recorded portions and events to subsequently present, or re-present, after the player has ended the wagering game session, a second wagering game that continues playing activity or features from the first wagering game. The second wagering game can emulate elements from the first wagering game. The second wagering game can also be a version of the first wagering game in a different form or fashion, and can extend or continue playing events or features of the first wagering game. A portion of, or event from, the first wagering game that can be continued in the second wagering game may be referred to herein as a "wagering game play-continuation opportunity", or a "game continuation opportunity" 151 because the portion or event of the first wagering game indicate opportunities for the system 100 to present a continuation of the first wagering game from a point in time related to the event or the portion of the first wagering game. The second wagering game, or rather the game extension or continuation content in the second wagering game, may be referred to herein as "wagering game play continuation" or "wagering game play-continuation content."

One way to present wagering game play-continuation content, according to some embodiments, is to embed wagering game content, and/or an object (e.g., a text link, a graphical link, etc.) that accesses the wagering game content, in an e-mail message 152. The wagering game content can includes some portion of a game event, theme, or feature from the first wagering game that can be continued, replayed, or re-displayed in a way that appears to be the extension or continuation of the first wagering game. The wagering game server 150 can send the e-mail via the communications network 122 to a server configured to handle e-mail (e.g., an e-mail server, a social networking website server that offers e-mail features, etc.). The player can later access the e-mail message 152 using the computer 137 or any other device that can connect to the communications network 122. The computer 137 can receive and present the e-mail message 152 in an e-mail client user interface 153. The e-mail message 152 can include wagering game play-continuation content ("content") 155 that continues or extends the portion of the game or game feature from the first wagering game. The content 155 can be a link, a code, an image, or any other form of content that provides wagering game continuation play or access to wagering game continuation play. Thus, by providing wagering game continuation play within, or in connection with, the e-mail message 152, the wagering game server 150 entices the player to extend wagering game activity into daily life after the player has stopped playing the wagering games at a wagering game venue. The content 155 can provide an incentive for the player to return to the wagering game venue and, in some embodiments, can include direct access to the wagering game venue. For example, the content 155 can launch an instance of a browser window after the player selects or activates the content 155 and present an online casino website page that includes a continuation game play. In another example, the content 155 can present slot reels, playing cards, or other game play elements in an embedded image within the e-mail message 152 and run a version of the previous game as a replay or new version of a gaming event that occurred during a previous wagering game session. These and other embodiments will be described in further details below.

Further, some embodiments of the inventive subject matter describe examples of controlling wagering game play continuation in a network wagering venue (e.g., an online casino, a wagering game website, a wagering network, etc. using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
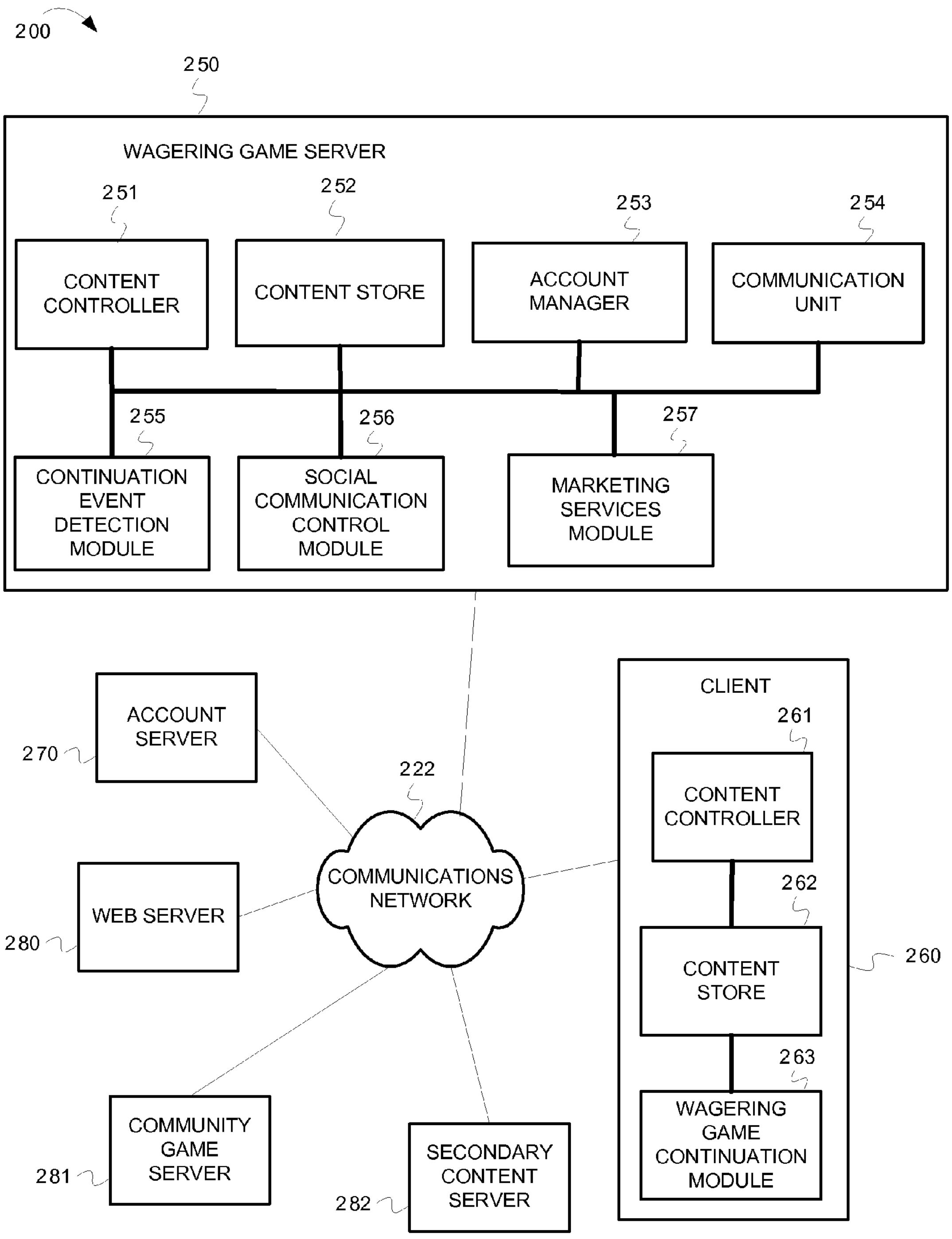
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networking networks. The account server 270 can store wagering game player account information, such as account settings (e.g., settings related to e-mail sorting, settings related to group games, settings related to social contacts, etc.), preferences (e.g., player preferences regarding e-mail sorting, player preferences regarding social contact affiliations, player preferences regarding game automation features, player, etc.), player profile data (e.g., name, avatar, screen name, etc.), and other information for a player's account (e.g., financial information, account identification numbers, virtual assets, social contact information, etc.). The account server 270 can contain lists of social contacts referenced by a player account. The account server 270 can also provide auditing capabilities, according to regulatory rules. The account server 270 can also track performance of players, machines, and servers.

The wagering game system architecture 200 can also include a wagering game server 250 configured to control wagering game content, provide random numbers, and communicate wagering game information, account information, and other information to and from the client 260. The wagering game server 250 can include a content controller 251 configured to manage and control content for the presentation of content on the client 260. For example, the content controller 251 can generate game results (e.g., win/loss values), including win amounts, for games played on the client 260. The content controller 257 can communicate the game results to the client 260. The content controller 251 can also generate random numbers and provide them to the client 260 so that the client 260 can generate game results. The wagering game server 250 can also include a content store 252 configured to contain content to present on the client 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the client 260 and to communicate with other systems, devices and networks. The wagering game server 250 can also include a continuation event detection module 255 configured to detect opportunities to re-present portions of wagering games or versions of the wagering games, via e-mail, subsequent to a wagering game session. The wagering game server 250 can also include a social communication control module 256 configured to generate content that notifies a player of wagering game play-continuation opportunities according to various embodiments. For example, the social communication control module 256 can embed images, codes, links, dynamic content, or other information within an e-mail that notifies a player of opportunities to play, replay, share, wager on, or otherwise control portions of a wagering game that the player played or selected from a wagering game venue. The social communication control module 256 can also send the e-mails to e-mail addresses, stored by the account server 270, that are associated with the player. The social communication control module 256 can also track activity that occurs via e-mails, such as use of links, images, codes, or other activation and control of game play and/or game play elements associated with the e-mail. Further, the social communication control module 256 can track that the content of the e-mail is provided (e.g., forwarded) to a social contact, or other user or user account. The social communication control module 256 can also detect that the social contact or other user or user account, uses the content in the e-mail. In some embodiments, the social communication control module 256 can also utilize text messaging, chat, or other forms of communication media in which to present wagering game play-continuation content. The wagering game server 250 can also include a marketing services module 257 configured to track sharing of e-mail content that continues or extends wagering game play. The marketing services module 257 can also track attributes, affiliates, activity (e.g., playing activity, bets, wins, redemption of awards, etc.) of a player that receives shared e-mail. The marketing services module 257 can also report information to the player that shared the e-mail of players that receive the e-mail. The marketing services module 257 can also track data for, and share data with, third-party sponsors that sponsor awards presented in the content. The marketing services module 257 can also provide services to which sponsors can subscribe, such as services that allow sponsor servers to send marketing e-mails from the wagering game server 250, receive gaming content to put in their own e-mails, provide rewards or incentives for insertion in gaming e-mails, modify e-mails sent from the wagering game server 250, track activity from sent e-mails, etc.

The wagering game system architecture 200 can also include a client 260 configured to present wagering games and receive and transmit information to control wagering game play continuation. The client 260 can be a computer system, a personal digital assistant (PDA), a cell phone, a laptop, a wagering game machine, or any other device or machine that is capable of processing information, instructions, or other data provided via the communications network 222. The client 260 can include a content controller 261 configured to manage and control content and presentation of content on the client 260. The client 260 can also include a content store 262 configured to contain content to present on the client 260. The client 260 can also include a wagering game continuation module 263 configured to present and control wagering game play continuation via electronic communications, including e-mail.

The wagering game system architecture 200 can also include a web server 280 configured to control and present an online website that hosts wagering games. The web server 280 can also be configured to present multiple wagering game applications on the wagering game machine 260 via a wagering game website, or other gaming-type venue accessible via the Internet. The web server 280 can host an online wagering website and/or a social networking website. The web server 280 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.).

The wagering game system architecture 200 can also include a community game server 281 configured to provide and control content for community games, including networked games, social games, competitive games, or any other game that multiple players can participate in at the same time.

The wagering game system architecture 200 can also include a secondary content server 282 configured to provide content and control information for secondary games and other secondary content available on a wagering game network (e.g., secondary wagering game content, promotions content, advertising content, player tracking content, web content, etc.). The secondary content server 282 can provide "secondary" content, or content for "secondary"

games presented on the client 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa.

The wagering game system architecture can also include mobile communications hardware configured to provide and control mobile content and communications, such as e-mail, text messages, instant messages, mobile applications, etc. The mobile communications hardware can utilize GSM (Global System for Mobile communications) protocols, the Short Message Service (SMS), or other communication standards associated with mobile communications, text messaging, e-mail, instant messaging, mobile applications, etc. The wagering game system architecture 200 can also include communications network antenna configured to transmit communications on a mobile network.

Each component shown in the wagering game system architecture 200 is shown as a separate and distinct element connected via a communications network 222. However, some functions performed by one component could be performed by other components. For example, the wagering game server 250 can also be configured to perform functions of the wagering game continuation module 263, and other network elements and/or system devices. Furthermore, the components shown may all be contained in one device, but some, or all, may be included in, or performed by, multiple devices, as in the configurations shown in FIG. 2 or other configurations not shown. For example, the account manager 253 and the communication unit 254 can be included in the client 260 instead of, or in addition to, being a part of the wagering game server 250. Further, in some embodiments, the client 260 can determine wagering game outcomes, generate random numbers, etc. instead of, or in addition to, the wagering game server 250.

As mentioned previously, in some embodiments, the client 260 can take the form of a wagering game machine. Examples of wagering game machines can include floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, clients and wagering game servers work together such that clients can be operated as thin, thick, or intermediate clients. For example, one or more elements of game play may be controlled by the client or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the clients can present a graphical representation of such outcome or asset modification to the user (e.g., player). In a thick-client example, the clients can determine game outcomes and communicate the outcomes to the wagering game server for recording or managing a player's account.

In some embodiments, either the client or the wagering game server(s) can provide functionality that is not directly related to game play. For example, account transactions and account rules may be managed centrally (e.g., by the wagering game server(s)) or locally (e.g., by the client). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable storage media including instructions for performing the operations described herein. Machine-readable storage media includes any mechanism that provides (i.e., stores and/or transmits) information in a form readable by a machine (e.g., a wagering game machine, computer, etc.). For example, tangible machine-readable storage media includes read only memory (ROM), random access memory (RAM), magnetic disk storage media, optical storage media, flash memory machines, etc. Some embodiments of the invention can also include machine-readable media, such as any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
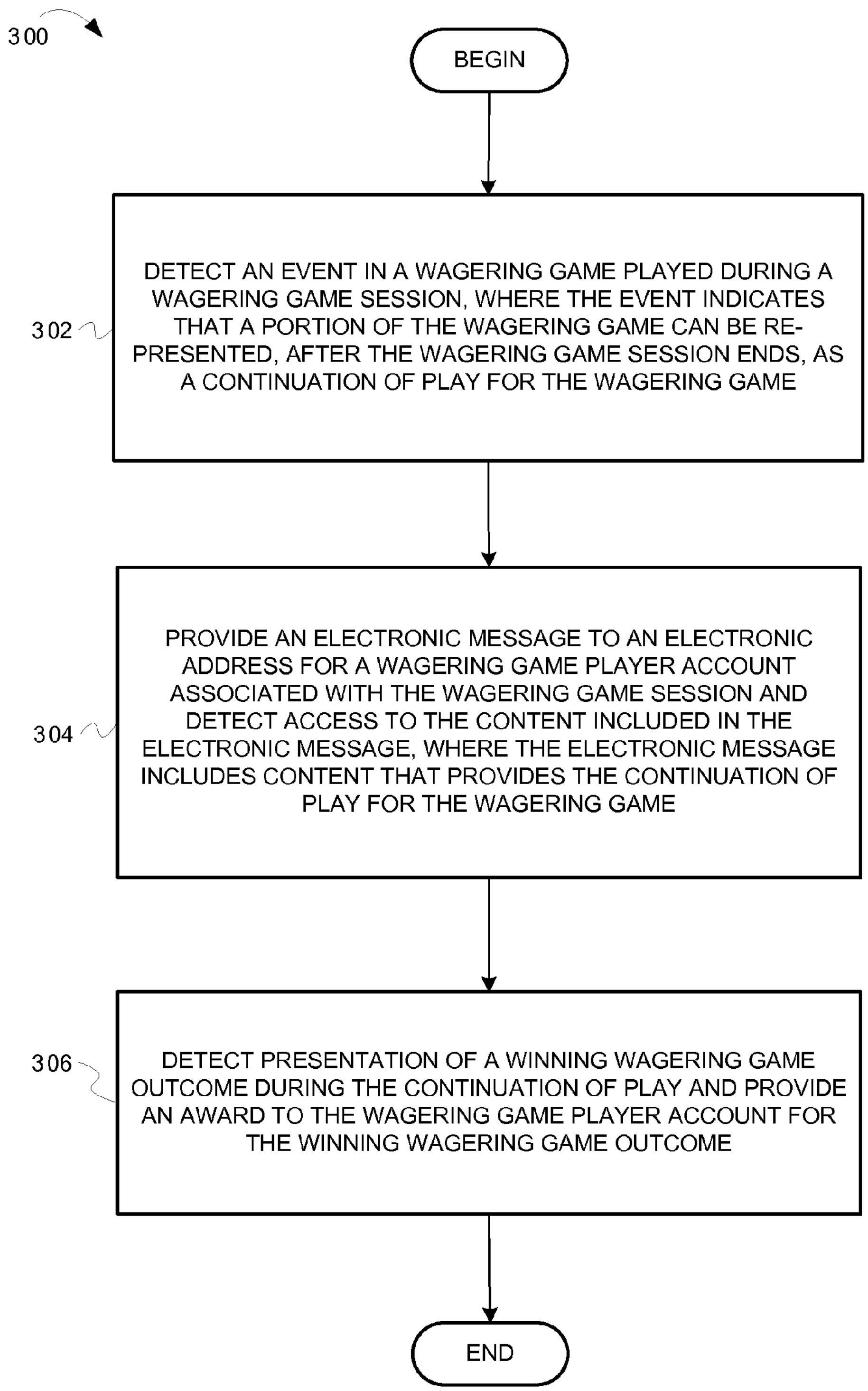
FIG. 3 is a flow diagram 300 illustrating providing wagering game play-continuation content, according to some embodiments.
Figure 4:
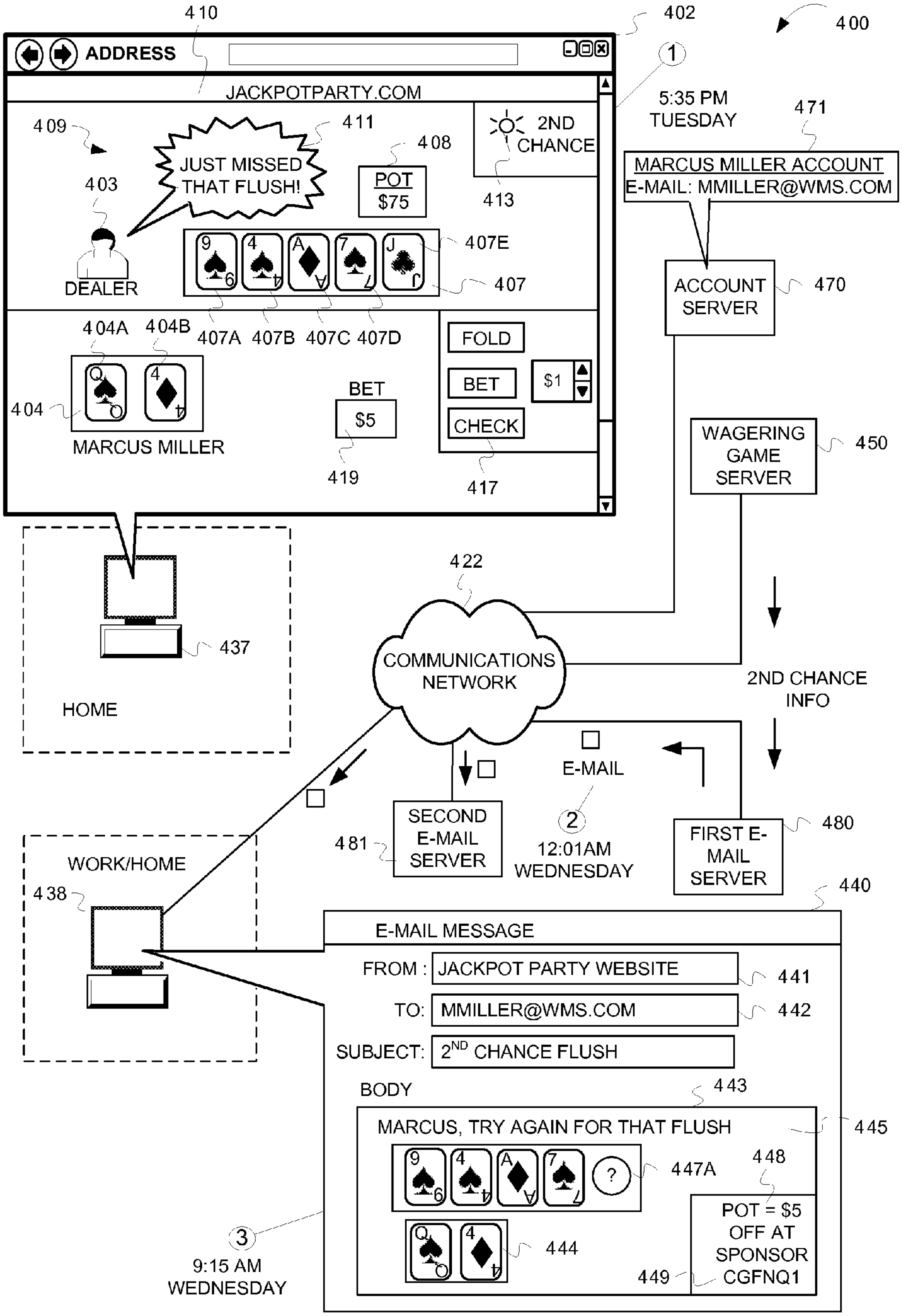
FIG. 4 is an illustration of providing second chance wagering game e-mail content for online wagering games, according to some embodiments.

FIG. 3 is a flow diagram ("flow") 300 illustrating providing wagering game play-continuation content, according to some embodiments. FIG. 4 is a conceptual diagram that helps illustrate the flow of FIG. 3, according to some embodiments. This description will present FIG. 3 in concert with FIG. 4. In FIG. 3, the flow 300 begins at processing block 302, where a wagering game system ("system") detects an event in a wagering game played during a wagering game session, where the event indicates that a portion of the wagering game can be re-presented, after the wagering game session ends, as a continuation of play for the wagering game. The system can determine opportunities to continue playing a portion of a wagering game content by tracking wagering game play of a wagering game player for a first wagering game and determining events that occur during the first wagering game that can later be re-presented, replayed, extended with a second wagering game (e.g., an additional round of play, a bonus game, an animation, etc.) that appears to continue play from the first wagering game. In some embodiments, the system generates wagering game content that the system can include in e-mails. The wagering game content can include dynamic images, flash files, vector graphic animations, three-dimensional animations, videos, redemption codes, links, embedded content, etc. For instance, the system can present wagering game content to replay a version of the first wagering game play from a point of a near win in the first wagering game. The point of the near win may include a point at which all of the wagering game elements, except one final wagering game element, have been displayed for the first wagering game. The displayed elements, except for the final element that has not been displayed yet, indicate that the player has a chance of winning if the final wagering game element results in a specific configuration or outcome value. In some embodiments, the specific configuration or outcome value can be configurations or values that would match a winning payout configuration or value of a pay table for the wagering game or that would provide a winning hand over some or all other players at a group game. For example, a player may play a slot game as the first wagering game. The slot game may utilize three specific face values (e.g., images) on the slot reels to line up in a winning sequence along a payline on slot reels to reveal at least one wagering game outcome according to the slot game rules and pay table. In one example, the slot game may utilize a sequence of three images of cherries as an indication of one possible winning outcome. The slot game may have at least three slot reels and two of the reels, which make up a first part of the winning sequence or winning combination, may have already lined up two cherries in a row along the payline based on a randomly generated outcome. The next slot reel (e.g., the last slot reel in the sequence if there are three reels, or the next consecutive slot reel if there are more than three) may stop and reveal an image that is not a cherry, also according to the randomly generated outcome. However, the system can detect that at least two cherries were depicted as being lined up along the payline and that only one more cherry was required to accomplish the three cherries in a row (i.e., only one more cherry was required to generate a winning sequence according to the slot game's rules and pay table). The system can thus flag the occurrence of the depiction of the two lined up cherries as a point before a possible win. If the next slot reel does not produce a cherry, the system can flag the opportunity as a missed win, or a near win.

In another example, as illustrated in FIG. 4, a wagering game system ("system") 400 can detect that a player plays a hand of cards in an online poker game 409. The player may narrowly miss getting a specific card hand, such as a flush, a straight, a three-of-kind, etc. that would cause the player to likely win the round of play. The system 400 can thus flag that opportunity as a near win and can follow-up with the player at a later point in time to present a opportunity to replay a portion of the hand for a second chance to try and obtain the flush, straight, three-of-a-kind, etc. that would have likely resulted in a win. More specifically, referring to FIG. 4, in some embodiments, the system 400 can include a computer 437 connected to a wagering game server 450 via a communications network 422. Also included in the system 400 are an account server 470, a first e-mail server 480 and second e-mail server 481, which are also connected to the communications network 422. The account server 470 host can host a wagering game account (e.g., player account 471 for the user "Marcus Miller"). A user (i.e., Marcus Miller) can log in to the player account 471 via a web browser 402 presented by the computer 437. The web browser 402 can also present an online wagering website ("website") 410 (e.g., "Jackpot Party.com") hosted by the wagering game server 450. The player can log in to the website 410 using player credentials for the player account 471. The wagering game server 450 can provide gaming content (e.g., the online poker game 409). The online poker game 409 can include an avatar 403, or other representation, of a dealer, a community hand 407 and a player's hand 404. The online poker game 409 can also present player controls 417 for controlling betting and other game play (e.g., fold hand, check hand, etc.) and a bet meter 419 for tracking amounts of bets placed on a particular hand of the online poker game 409. The website 410 can present the gaming content, which the player account can utilize during a wagering game session. The wagering game server 450 can also host a social network. The wagering game server 450 can include other devices, servers, mechanisms, etc., that provide functionality (e.g., controls, web pages, applications, etc.) that web users can use to connect to the website 410 and utilize social networking and website features (e.g., communications mechanisms, applications, etc.). The wagering game server 450 can provide social communication content, including a chat application or e-mail application. The wagering game server 450 can also integrate with a separate server that provides social communication functionality and services, such as the first e-mail server 480. The first e-mail server 480 may be associated with the wagering game venue and can access from the account server 470 an e-mail address that is associated with the player account 471. The second e-mail server 481 is an e-mail server that a player can connect to using, in some embodiments, either the computer 437 or computer 438 as long as either the computer 437 or the computer 438 is connected to the communications network 422. The second e-mail server 481 provides received e-mails to the computer 437 or the other computer 438. In some embodiments, the computer 437 is a separate computer from 438, which are accessed at separate times and/or locations. In some embodiments, the computer 437 and the computer 438 may be the same computer that are accessed from the same location, but at different times.

In some embodiments, the system 400 can, at a first stage (i.e., at stage "1") detect an event that indicates a near-win opportunity, such as the near completion of the flush mentioned above. The cards 407A-407D may all be displayed during the betting of a round of play, but card 407E may not have been displayed yet. Based on the suits of the cards 407A-407D in the community hand 407 and the suits of cards 404A and 404B in the player's hand 404, the player has four spades. One more spade would make a flush according to the rules of the game. A flush is a very high hand in poker and could potentially win the round of play. The wagering game server 450 can recognize the configuration of the cards 407A-407D and 404A-404B as a potential wagering game continuation opportunity if the final card 407E does appear with a suit that makes a flush for the player (i.e., if card 407E does not show a spade as its suit). When card 407E, the final card of the round, is played and its suit is not a spade, the system 400 recognizes that the player account 471 has experienced a miss, or near win (which in this case may be considered a near "potential" win because other hands by other players may still beat a flush). More generally, the system 400 recognizes the outcome of the hand as a potential opportunity to present a second chance for the player account 471 to replay the hand as an incentive to cause the player to return at a later time, as a reward for current play, as a marketing strategy, or for any other reason. The system 400 can then present an indicator 413 or an indicator 411 that indicates to a player that a second chance opportunity has occurred and that the player will be receiving a follow-up communication with wagering game content that provides a wagering game continuation opportunity.

The flow 300 continues at processing block 304, where the system provides an electronic message to an electronic address for a wagering game player account associated with the wagering game session and detects access to the content included in the electronic message, where the electronic message includes content that provides the continuation of play for the wagering game. In some embodiments, the system sends the electronic message after a pre-specified period of time has passed after the wagering game session ends. The system can also detect use of content in the e-mail to perform a continuation of play of the portion of the wagering game. Returning to FIG. 4, after determining the game continuation opportunity described above, for state "1", the wagering game server 450 can wait a pre-specified amount of time to communicate the game continuation opportunity with the first e-mail server 480. In other embodiments, the wagering game server 450 can communicate the game continuation opportunity immediately and the first e-mail server 480 can wait the pre-specified amount of time to send an e-mail message 440 to the second e-mail server 481. The system 400 can wait the pre-specified amount of time to ensure that the e-mail 440 arrives at the second e-mail sever 481 after a player has completed their wagering game session at the website 410. In one example, the first e-mail server 480 can wait a given number of hours (e.g., 4 hours) after a player has logged out of the website 410 or wait until a specific time of day when the player is likely not logged on to the website 410. In the embodiment illustrated in FIG. 4, for example, at stage "1" the wagering game server 450 recognizes the wagering game continuation opportunity and presents the indicator 413 at 5:35 PM on a Tuesday evening. However, the first e-mail server 480 waits until 12:01 AM on Wednesday morning, at stage "2," to send the e-mail 440 to an e-mail address for the player account 471. The e-mail address associated with the player account 471 may be a personal e-mail address, a work e-mail address, or any other e-mail address that the player can later access. The first e-mail server 480 sends the e-mail message 440 which, via routing on the communications network 422, until the e-mail message 440 is eventually is delivered to the second e-mail server 481. In some embodiments, the system 400 can aggregate more than one game continuation opportunity from a wagering game session into a single e-mail message. The system 400 can also utilize a combination of waiting periods and pre-set time periods. For example, if stage "1" occurred at 11:30 PM on Tuesday, the system 400 may have a 4 hour waiting period in place, so that even though a default time of 12:01 AM would normally trigger the sending of the e-mail message 440, the system 400 can also enforce the 4 hour time period so that if a player does not log off within the 4 hour time period of 12:01 AM, then the system 400 can override the default sending time and present the e-mail 440 only four hours after the player logs out of the website 410. In other embodiments, the system 400 can track idle time of a player login as the waiting period so that even if a player does not log out, the system 400 uses as the waiting period the idle time on the computer 437 or idle time without activity on a particular gaming session presented in the web browser 402. In some embodiments, the system can send e-mails at an exact time of day specified by a player (e.g., the player specifies to send e-mails at 8 AM to a specific e-mail address).

At a third stage (i.e., stage "3"), the player can access the computer 438 and retrieve the e-mail message 440. The e-mail message 440 includes sender information in a first header 441, recipient information in a second header 442, and wagering game content 445 in a body 443. The body 443 includes content 445 that a recipient of the e-mail can use to continue play of some portion the wagering game 409 that was previously played. For example, a portion of the online poker game 409 is presented for replay within the wagering game content 445. The replay is of the round of play that included the player's hand 404 and the community hand 407 for which the player narrowly missed receiving a flush. The wagering game content 445 presents an additional player's hand 444 that matches the previous player's hand 404. The content 445 can also include an additional community hand 447, with a final wagering game element 447A that is not displayed (or that is displayed as it previously appeared in the online poker game 409 but as a re-playable element within the wagering game content 445). The final wagering game element 447A is the final card dealt in the round of play. When the final wagering game element 447A is revealed, the wagering game content 445 can continue play based on the revealed result of the final wagering game element 447A, thus providing an opportunity to play a version of the online poker game 409 from the point of a near, or potential, win (e.g., to reveal the final wagering game element 447A which may result in a flush). The wagering game content 445 can present additional betting controls for the e-mail recipient to make additional bets. In some embodiments, however, the system 400 can use a pre-paid bet amount, either from the bet indicated in the bet meter 419 or from a third party (e.g., a casino, a sponsor, an affiliate, a social contact, etc.). In another example, the wagering game content 445 can present a pot 448 with a reward code 449. The pot 448 can include a cash prize reward based on the pot amount indicated in a pot meter 408 from the wagering game 409, a proportional amount indicated in a pot meter 408 (e.g., a percentage of the pot meter 408 based on one or more of a player's playing history, a player's loyalty points level, a player's status level, etc.), or it can include a non-cash prize reward, such as reward code 449, which is a discount code for five dollars off of a sponsor's merchandise. The system 400 can involve a sponsor, such as a business that partners, or collaborates, with the website 410 to provide rewards. In some embodiments, the sponsor may own or control the first e-mail server 480 and may generate the e-mail message 440. In some embodiments, the sponsor may only integrate with the first e-mail server 480 and provide rewards to include in the wagering game content 445 for the e-mail message 440, but the first e-mail server 480 may be owned or controlled by the website 410. In some embodiments, the sponsor can subscribe to a marketing type of service provided by the website 410 where the sponsor is guaranteed a certain number of e-mails or a certain amount of marketing services related to e-mails that mention the sponsor or include rewards or incentives from the sponsor. In some embodiments, the system 400 can send notification of the indicator 413 to the sponsor or get authorization from the sponsor to provide a pre-purchase of an extension or continuation of wagering game play or a reward for wagering game continuation play. In some embodiments, game play within, or initiated by, the e-mail message 440 can be non-cash, or in other words, have no cash betting functionality or betting transactions associated with the game play, but may still offer rewards for playing, such as providing sponsor coupons, player points, invitations to tournaments, entries into a sweepstakes, chances to increase player trophies, bonus money (e.g., money with specific play-through restrictions), etc. The system 400 can automatically award any or all of the rewards. In some embodiments, a sponsor, or marketer, can determine that a specific e-mail message has been opened and viewed (e.g. via a player opening up an e-mail message, via a player playing content within an e-mail message, via a player clicking a link within the e-mail message, etc.). In some embodiments, the e-mail message can require the player to manually validate that the player has read and viewed the message (e.g., require the player to type a value into e-mail content, require the player to respond to an e-mail, require the player to verify a discount amount specified in the e-mail message, etc.).

Returning to FIG. 3, in some embodiments, the system can present wagering game continuation content that is a direct continuation of the previous game play. For example, the system can detect a point in play at which a player has stopped playing during a wagering game session. The system can send an e-mail message that includes a follow-up game, which directly continues using the last played game. Thus, the system can present within the content of the e-mail message a game image, a code, or link to a game application, that utilizes similar assets (e.g., graphics, themes, denominations, etc.) as the last played game. For instance, the e-mail message can include a link to a website that will present an additional bonus round to a previously played game. The link can launch the additional bonus round using unique identification information (e.g., a unique code) embedded in metadata associated with the e-mail message. The system can use the unique identification information to launch a wagering game session of the bonus game within an instance of a web browser. In some embodiments, the metadata can also include the unique identification information (e.g., login credentials) to login a player directly to the website. In other embodiments, however, the system can prompt the player to re-login manually to a player account to access the additional bonus game at the website. The system can embed an image or file (e.g., a flash animation or application, a dynamic image, a widget, etc.) in the e-mail message that can resolve from the e-mail message back to a wagering game server. The system can enable the player to manipulate controls within the embedded images or files on the e-mail message, transmit information to a server, and control wagering activity on the server based on the use of the controls from the image or file embedded in the e-mail.

The flow 300 continues at processing block 306, where the system detects presentation of a winning wagering game outcome during the continuation of play and provides an award to the wagering game player account for the winning wagering game outcome. In some embodiments, the system can present, or detect presentation of, an additional game outcome for the version of the wagering game from the point of a near or potential win that was previously missed. For instance, in FIG. 4, the final wagering game element 447A can be revealed at stage "3." At stage "1" the outcome of the online poker game 409 may be based on a first random number(s) or identifier(s). The revealed outcome at stage "3" can be based on a second random number(s) or identifier(s). In some embodiments, the wagering game server 450 can communicate with the wagering game content 445 and present a new random result for the final wagering game element 447A at stage "3" based on the second random number(s) or identifier(s). The new random result may be different from the previous result at stage "1." If the new random result has a winning outcome, the system 400 can reward the pot indicated in the pot 448. For instance, the reward code 449 may be presented or activated. For example, the wagering game content 445 can communicate with a sponsor server to either reveal a valid code as the reward code 449 (e.g., after the final wagering game element 449A is revealed as a win) or to make the reward code 449 active (e.g., if the reward code 449 was revealed before the final wagering game element 449 was revealed). In some embodiments, the reward code 449 may be valid regardless of a win or loss result, but the value of the reward may increase (e.g., increase from 5% off to 10% off the sponsor's merchandise).

Returning to flow 300, the system can also reveal a wagering game outcome for other types of wagering game continuations, such as an outcome of a new bonus game, a new hand of cards, a new slot reel spin or other types of game outcomes that may be presented in, or because of, wagering game content within an e-mail message. Further, in some embodiments, the system can present an interface at an online website that divides, or separates, the wagering game play-continuation content into categories (e.g., game types, near win types, denomination values, degrees of potential winnings, etc.).

Figure 5:
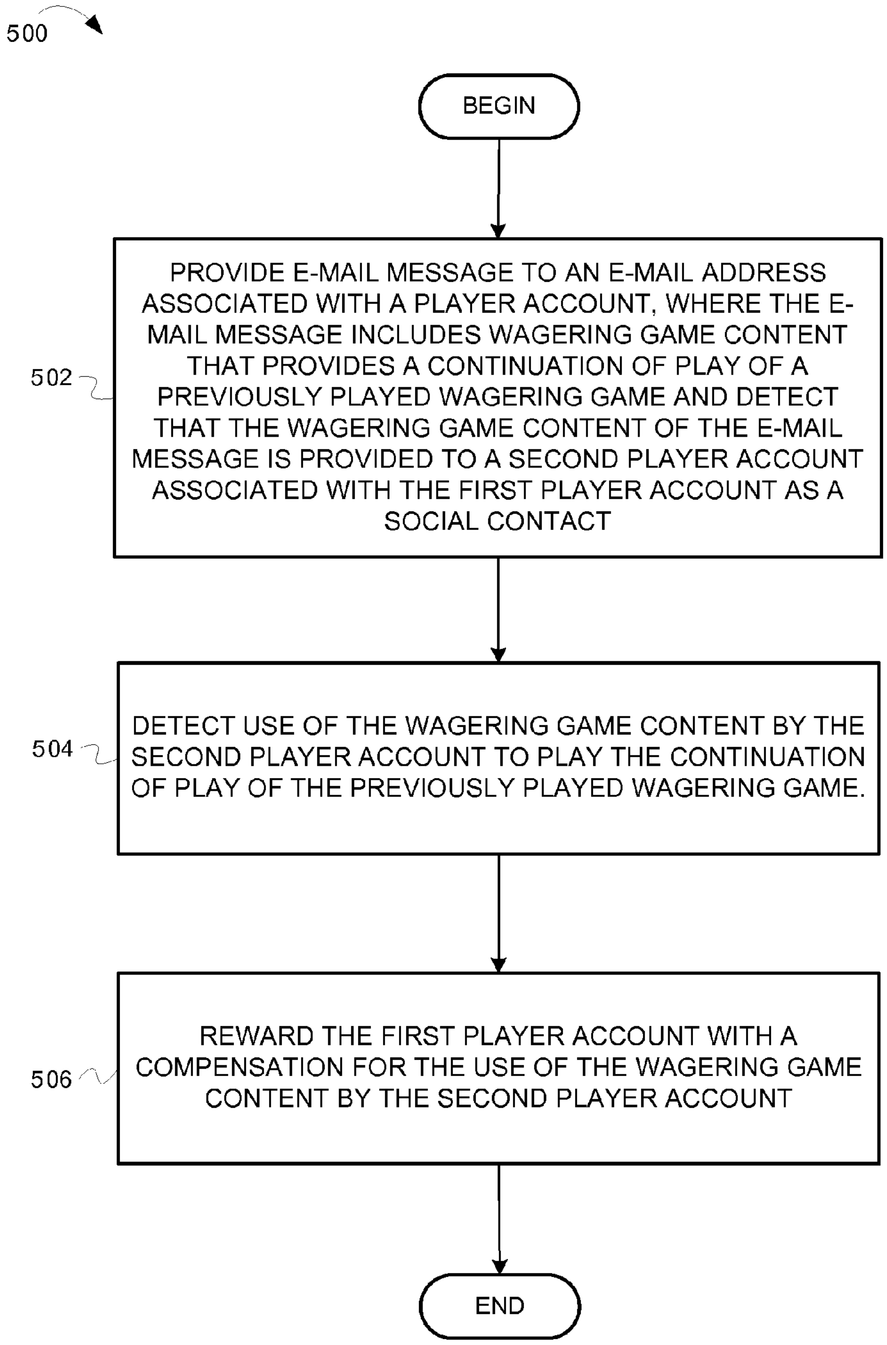
FIG. 5 is a flow diagram 500 illustrating controlling wagering game play continuation, according to some embodiments.
Figure 6:
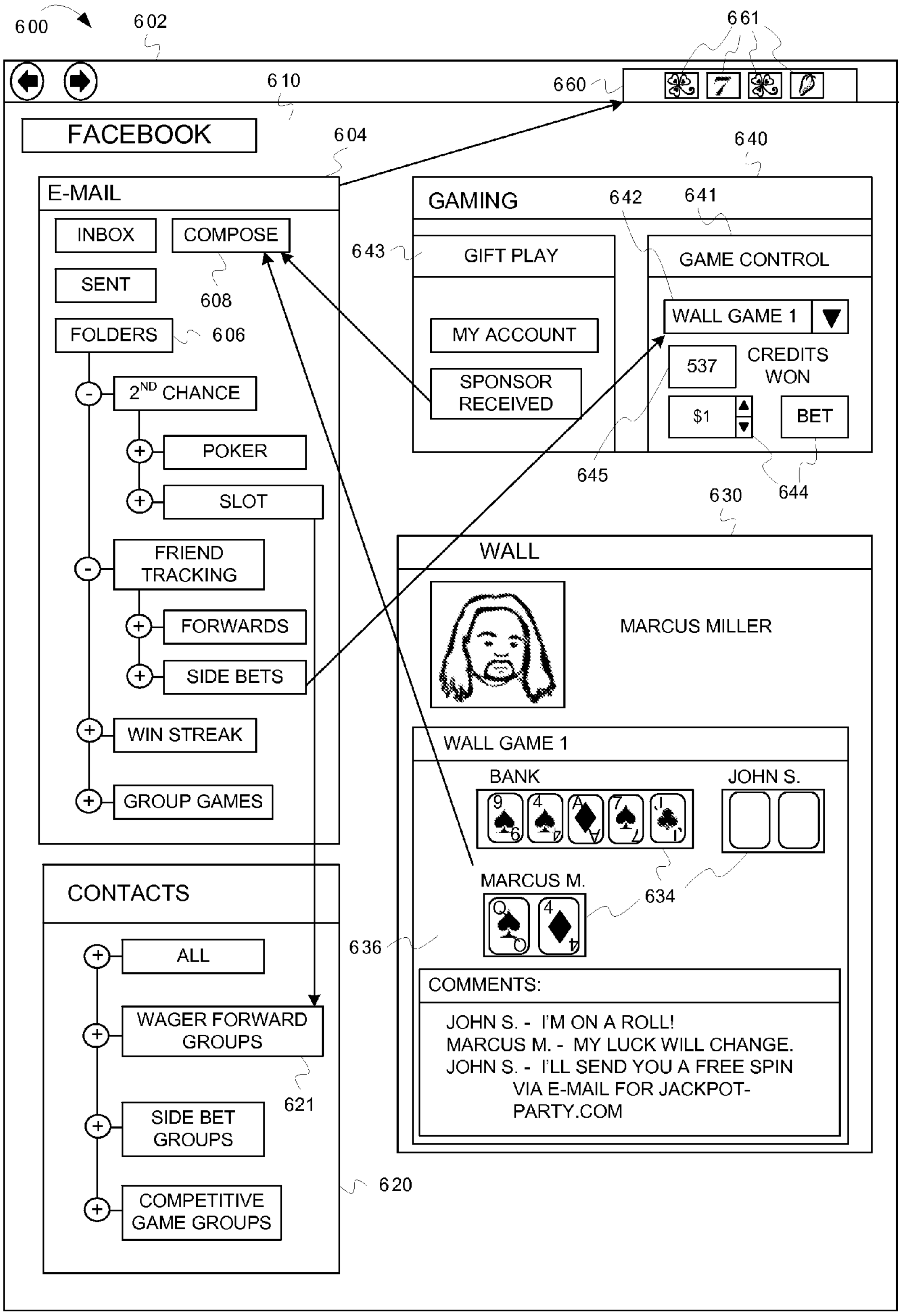
FIG. 6 is an illustration of controlling wagering game continuation e-mail content via social networking applications, according to some embodiments.

FIG. 5 is a flow diagram ("flow") 500 illustrating controlling wagering game play continuation, according to some embodiments. FIG. 6 is a conceptual diagram that helps illustrate the flow of FIG. 5, according to some embodiments. This description will present FIG. 5 in concert with FIG. 6. In FIG. 5, the flow 500 begins at processing block 502, where a wagering game system ("system") provides an e-mail message to a an e-mail address associated with a player account, where the e-mail message includes wagering game content that provides a continuation of play of a previously played wagering game and detects that the wagering game content is provided to a second player account associated with the first player account as a social contact. In some embodiments, the system can provide the wagering game content of the e-mail message from the first player to a second player. For example, the system can detect that the e-mail message was sent or forwarded from the first player to a second player. In some embodiments, the system can detect that the e-mail message was dragged and dropped onto social contact in a social networking website application (e.g., e-mail dragged and dropped from a FaceBook™ e-mail application to a FaceBook™ friends application) or an e-mail client application (e.g., e-mail dragged and dropped from a Microsoft® Outlook™ Inbox to a Microsoft® Outlook™ contacts folder). In some embodiments, the system can detect that a game image in e-mail message was copied into another e-mail or other communication medium (e.g., copied into a chat message, copied onto a disk, embedded into website content, etc.) and was sent or provided to the second player via the other communication medium or by other ways (e.g., provide a code from the wagering game content to another player who then enters the code into a website application). In some embodiments, the system provides the e-mail message to a social networking website that provides the e-mail to a user associated with the e-mail address via functionality of the social networking website.

FIG. 6 illustrates an example of a system 600 with a web browser 602 that presents a social networking website ("website") 610 which includes an e-mail application 604, a contacts application 620, a gaming application 640, and a comments application 630. The web browser 602 can also include a gaming toolbar 660. The e-mail application 604 includes interface options, such as controls, buttons, panels, selectable images, etc., that enable e-mail functionality within the e-mail application 604. One of the interface options includes folders 606. In some embodiments, when a player receives an e-mail message from the website 610, the e-mail application 604 can automatically sort the e-mail message based on types of content provided in the e-mail message. For example, the e-mail application 604 can automatically sort game continuation e-mail messages based on a type of game continuation opportunity (e.g., a "second chance" or "replay" opportunity as described above in FIG. 4, a "win streak" continuation opportunity as described further below, a "group game" opportunity as described further below, etc.). In some embodiments, the e-mail application 604 can also automatically sort game continuation e-mail messages based on game type (e.g., poker, slots, etc.). In some embodiments, the e-mail application 604 can also automatically sort game continuation e-mail messages based on friends that provided the game continuation e-mail messages or friends to whom a game continuation e-mail message was provided. In some embodiments, a contact application 620 can also separate contacts based on their association with game continuation e-mail messages. For instance, the contact application 620 can sort contacts into distribution groups to which a user can forward game continuation e-mail messages, distribution groups to which the a user can communicate via e-mail messages about side bet opportunities on game continuation e-mail messages, distribution groups to which a user can challenge to competitive or collaborative group games indicated in game continuation e-mail messages. In some embodiments, the contact application 620 can sort social contacts that are associated with a wagering game venue or wagering game server. The contact application 620 can also track affiliation relationships between contacts, via communications with a wagering game server and/or account server. The contact application 620 can then provide reports or other information about affiliate rewards or activities between contacts.

Returning momentarily to FIG. 5, the flow 500 continues at processing block 504, where the system detects use of the wagering game content by the second player account to play the continuation of play of the previously played wagering game. In some embodiments, the system can detect use during an online wagering game session at the online wagering venue (e.g., if the second player account launches the continuation of play in a web browser). In some embodiments, the system can detect that the second player accesses and plays the wagering game content from within the e-mail message itself. In other embodiments, the system can detect that the second player account plays the continuation of play on a social networking website, or on a web widget or on a toolbar. For example, the system can use e-mail content to play in a social network website and coordinate activity from the social network website interface with an online gaming server. For instance, as illustrated in FIG. 6, the e-mail application 604 can provide capabilities to drag and drop an e-mail message (or representation of the e-mail message, such as a graphic or icon that represents a particular game continuation e-mail message) onto the other applications or web browser objects (e.g., onto the gaming application 640, onto the contacts application 620, onto the comments application 630, onto the gaming toolbar 660, etc.). Through drag and drop, or other ways of selecting and/or associating information (e.g., touch screen, mouse click, arrow keys, keystroke patterns, etc.) the system 600 provides functionality that manipulates and transfers or associates game continuation content from e-mail messages within the e-mail application 604 to the other applications. When game continuation e-mail content is transferred or associated with the other applications, the other applications can respond in different ways. For example, if a game continuation e-mail is dropped onto the "wager forward groups" folder 621, the e-mail application 604 can generate a draft e-mail message that will copy an e-mail address for some, or all, contacts listed in distribution groups listed within the "wager forward groups" folder 621. In another example, if a game continuation e-mail is dropped onto a game control panel 641, the gaming application 640 can initiate a continuation of a wagering game. For instance, the gaming application 640 can select an option 642 that indicates where to present, or transfer presentation of, the content of the e-mail message (e.g., present in the comments application 630, present in an interface associated with the gaming application 640, present in a different instance of the web browser 602, present on the gaming toolbar 660, etc.) In one example, the option 642 indicates that the content can be transferred to, or instantiated within, the comments application 630. In other embodiments, an e-mail message can be dragged directly onto the comments application 630 to transfer the e-mail content or instantiate the game continuation play within the comments application 630. An example of using the comments application 630 to play a wagering game may include presenting wagering game elements 634 that were in the e-mail, or specified by the e-mail content, within a comments interface 636. In some embodiments, the wagering game elements 634 can be graphics, text, or any other content consistent with the functionality of the comments application 630. In some embodiments, the comments application 630 can provide wagering controls or keyboard input commands for controlling the wagering game play within the comments interface 636. In some embodiments, the system 600 can also transfer the wagering game elements 634 to an e-mail message. The system 600 can capture a state of play of the wagering game elements 634 (e.g., capture an image of a spin result, capture an image of a hand of play, etc.) and generate a representation of the state of play (e.g., generate a set of instructions that describe the image of the spin result, generate an animation that presents a portion of the hand of play, etc.). The system 600 can detect a selection of a contact listed in the contacts application 620 and create an electronic mail message with wagering game content that includes the representation of the state of play. The system 600 can then send the e-mail message to an e-mail address associated with the contact. In some embodiments, the system 600 can detect use of the wagering game content by the contact that received the e-mail message to play a continuation of the wagering game (e.g., to play a second wagering game that continues from a point in the wagering game on the comments application 630). The system 600 can also award the wagering game player account that sent the e-mail for the use of the wagering game content by the contact to play the continuation of the wagering game.

In other embodiments, the system can include wagering controls in the gaming application 640, such as the betting controls 644 and the credit meter 645. In some embodiments, the gaming application 640 can log in to a wagering game player account stored on an account server (not show). The account server may be associated with an online gaming venue and can track bets, wins, rewards, or other gaming activity that occurs within the e-mail application 604, the comments application 630, the gaming application 640, the gaming toolbar 660, etc.

In another example, the system 600 can transfer wagering game content from e-mail messages (e.g., via drag and drop) onto the gaming toolbar 660. The gaming toolbar 660 may be a separate element from the website 610 and may not be associated with the website 610. For example, the gaming toolbar 660 may be a plug-in application that is associated with the web browser 602 and that communicates directly with gaming servers without having to integrate with social networking services associated with the website 610. In some embodiments, the web browser 602 can detect wagering game content selected from an e-mail message within the e-mail application 604, copy the wagering game content from the e-mail message (or from a source indicated in the e-mail message), and present a game continuation opportunity within the gaming toolbar 660. For instance, the gaming toolbar 660 can include wagering game elements 661 that present game play, wagering game outcomes, betting activity, etc. In another embodiments, the system 600 can activate the gaming toolbar 660 (e.g., spin reels, play a hand, etc.) based on the use of the wagering game content with the e-mail message. For example, a player may use a code or link within the e-mail to visit a sponsor's website or purchase a sponsor's product. As a result, the system 600 can provide a free spin of the gaming toolbar 660 in association with, or in addition to, any game continuation play that occurred within the e-mail message.

In some embodiments, the system 600 can transfer content from the applications within the website 610 to the e-mail application 604 for gaming purposes. For example, a game played within the comments application 630 can be associated with an e-mail, such as by dragging the game content from the comments interface 636 onto a compose button 608 to transfer a continuation opportunity into a new e-mail message. The game content from the comments interface 636 may instead be dragged onto a contact folder of the contacts application 620, onto the gaming toolbar 660, onto the gaming application 640, etc.

Returning again to FIG. 5, the flow 500 continues at processing block 506, where the system rewards the first player account with a compensation for the use of the wagering game content by the second player account. The system can reward the first player account with a portion of the second player's winnings, with reward with points, with additional e-mail game continuation opportunities, or with other rewards. The system can also include a wagering game server, or a marketing services module on (e.g., marketing services module 257) on a device, which can track who the first player sent the e-mail content to and what the second player account did with the e-mail content. In some embodiments, the marketing services module can track gaming activity for the second player account and attribute the gaming activity, or results of the gaming activity, with the first player account. For example, if the first player account sends the second player account a free spin for a game continuation opportunity, and the second player account wins a jackpot using the free spin, the marketing services module can attribute some of the jackpot winnings to the first player account. The second player account becomes affiliated with the first player account by accepting the free spin. In some embodiments, the marketing services module can provide other rewards, such as player loyalty points to the first player account instead of winnings. In some embodiments, the marketing services module can also affiliate players with bots and devices.

In some embodiments, referring to FIG. 6, a first player can pre-purchase a specific number of bets that the first player can provide to a second player via e-mail messages so that the second player can continue game play from one of the second player's previous gaming sessions. The gaming application 640 can include functionality that allows the first player to generate e-mail messages and include free game plays within the e-mail messages. For example, in some embodiments, the gaming application 640 can include a content sharing interface from which a player can select an option and associate it (e.g., drag and drop) with the e-mail application 604 (e.g., drag and drop a pre-purchased game play or "gift" game play onto the compose button 608 to embed game continuation pre-purchases into an e-mail). In some embodiments, if a first player sponsors play for a second player via e-mail (e.g., sends a pre-purchased play via e-mail, forwards a continuation opportunity, etc.), the system 600 can detect the sponsorship and can reward the first player by improving odds of play for the first player.

Additional Example Embodiments

According to some embodiments, a wagering game system ("system") can provide various example devices, operations, etc., to control wagering game play continuation. The following non-exhaustive list enumerates some possible embodiments.

In some embodiments, the system can provide a subscription service to which a player can subscribe to play a game in an e-mail message for a scheduled period. For instance, a player can use the system to subscribe to play a dollar a day on a specific wagering game for a certain number of days. During the period of the number of days, the system can send an e-mail message each day that displays a result of the wagering game play. The subject line of the e-mail message, for instance, can indicate the game and/or the result. Thus, the e-mail message repeats a continuing game over the period. The number of games during the period can all be part of a single wagering game session for purposes of tracking player time and/or game play history. In some embodiments, a player can subscribe another player to the same subscription service, and pay for the other player's game plays, so that the other player only has to receive e-mail messages. The system can also automatically play games within the e-mail messages for the player according to a specific rule set selected by the player that performs a specific game play strategy (e.g., aggressive, conservative, etc.). In some embodiments, the system can utilize a player's playing history or patterns to determine a game play strategy that resembles the player's specific playing history or patterns.

In some embodiments, the system can send e-mails that attempt to keep a winning streak going via e-mail. For instance, if a player has a winning streak during regular play, the system can recognize an opportunity to send an e-mail that extends the winning streak. Specifically, if the player wins two games in a row (e.g., receives a reward or wins a bet), the system can detect a two-game winning streak. If the player does not win the subsequent game, the system can send an e-mail to the player indicating an opportunity to replay the subsequent game to try and keep the two-game win streak going In some embodiments, the system can present an e-mail message that has a partial wagering game result with an opportunity to complete the result. For example, the system can present an e-mail with three reels of a slot game stopped in final positions, but a fourth game reel is actively moving and has not stopped in a final position. The player can complete the game play by activating a control that stops the fourth reel from spinning, revealing the final game result. The same effect can be used with cards where the final card of a poker hand or blackjack hand is unrevealed and the player can activate e-mail content to reveal the final card. In some embodiments, the e-mail content can present the partial wagering game result and direct the player to a website page that will reveal the final element of the wagering game result (i.e., start the player off with the partial wagering game result).

In some embodiments, the system can provide incentives such as replacement elements, multipliers, or other enhancements to a wagering game that a player can use upon return to an online wagering website. For instance, in some embodiments, the e-mail content includes a replacement reel or a "wild" reel that a player can use to replace a reel on a game on a wagering game website. In some embodiments, the system can provide a multiplier that gives increases for heavy players based on past playing history, player point or status levels, etc.

In some embodiments, the system can send e-mail notifications of activities that occur for long standing wagering games. For example, some wagering games continue playing by themselves, on a wagering game server, after a player has finished, or logged out of, the wagering game. These types of wagering games may include a character (e.g., a fish, an avatar, etc.) that represents the player. During the long standing wagering game, the player's character may randomly win prizes or perform wagering activity. An example of a long standing wagering game may include fish tank for fish to swim in and eat coins, which coins represent awards or prizes for the player's character to win while the player is away from the wagering venue. The system can generate e-mails to notify the player of activities that occur during the fish tank game. In some embodiments, the system can require the player to perform an activity via the e-mail to be able to retrieve awards won during the long standing wagering game.

In some embodiments, the system can notify players of wagering game results that occurred for game play performed during a wagering game session. For example, a player can activate a control (e.g., press a button to select either red or black) on a wagering game website, and the system can send an e-mail notification of a wagering game result (e.g., whether the wagering game result was red or black). The e-mail notification includes the wagering game outcome, which the player cannot determine until receiving the e-mail notification at a later time. The e-mail content can include further instructions on how to redeem a prize associated with the wagering game outcome.

In some embodiments, the system can detect the player's jurisdiction, determine jurisdictional rules for gambling, and adjust the e-mail content accordingly. For example, if the player opens an e-mail message that is stored on a server in a jurisdiction that does not allow gambling, the e-mail content can dynamically modify itself to eliminate wagers or to provide only non-cash awards and/or non-cash wagers. In other embodiments, the system can direct wager instructions from an e-mail message to a server that is within a jurisdiction that permits gambling and the server can transact the wagering activity.

In some embodiments, the system can provide group games via e-mail. For instance, the system can provide a group game whose rules require a player to compete by responding (i.e., replying) as quickly as possible via e-mail to represent a move or play a turn for a competitive wagering game. The system can respond to specific text instructions included in the e-mail content or in subject lines of the e-mail message. Some of the text instructions can convey the player's moves but can also function to help or hinder other players within the competitive wagering game.

In some embodiments, the system can provide incentives to scan non-wagering game e-mails for marketing purposes or data mining. For example, the system can provide an e-mail client at the wagering venue that would provide e-mails, with game continuation content, that arrive during the wagering game session, instead of after the wagering game session, as an incentive to allow all e-mail content to be scanned. The incentives can increase when more e-mails arrive at the e-mail client.

In some embodiments, the system can utilize e-mail message as wagering game elements of a wagering game. For instance, each e-mail message can represent a single card or a single slot reel of a wagering game that utilizes multiple cards or slot reels to reveal an overall game result. The system can deliver the e-mail messages consecutively, with a minor delay between each e-mail message, so that the overall outcome of the wagering game is revealed slowly by one wagering game element (i.e., e-mail message) at a time. In some embodiments, a player can delete certain e-mail messages to delete the wagering game element. The system can then send a replacement e-mail message with a replacement wagering game element (e.g., to discard a card, the player deletes the e-mail message, the e-mail client reports back to the wagering game server that the e-mail message was deleted, and the server generates a new card/e-mail message for the player).

In some embodiments, the system can utilize e-mails to receive and send player instructions regarding wagering game play. For example, the system can detect when a player sends an e-mail that contains instructions from the player for a wagering game (e.g., the e-mail instructs a wagering game server to "hit" or "stand" for a wagering game presented via e-mail).

In some embodiments, the system can embed the results or outcome of a wagering game within a marketing message sent via e-mail or text. The system can require a player to view the marketing message to see the results or outcome. In some embodiments, the system can require the player to visit a website or view a commercial before presenting the results or outcome.

In some embodiments, the system can syndicate e-mail opportunities to marketers. For example, the system can provide wagering game play-continuation content to go inside marketing e-mails for retailers, electronic retailers ("e-tailers"), etc., syndicating the wagering game within the e-mail content through the retailer's or e-tailer's marketing.

Additional Example Operating Environments

This section describes example operating environments, systems and networks, and presents structural aspects of some embodiments.

Computer System

Figure 7:
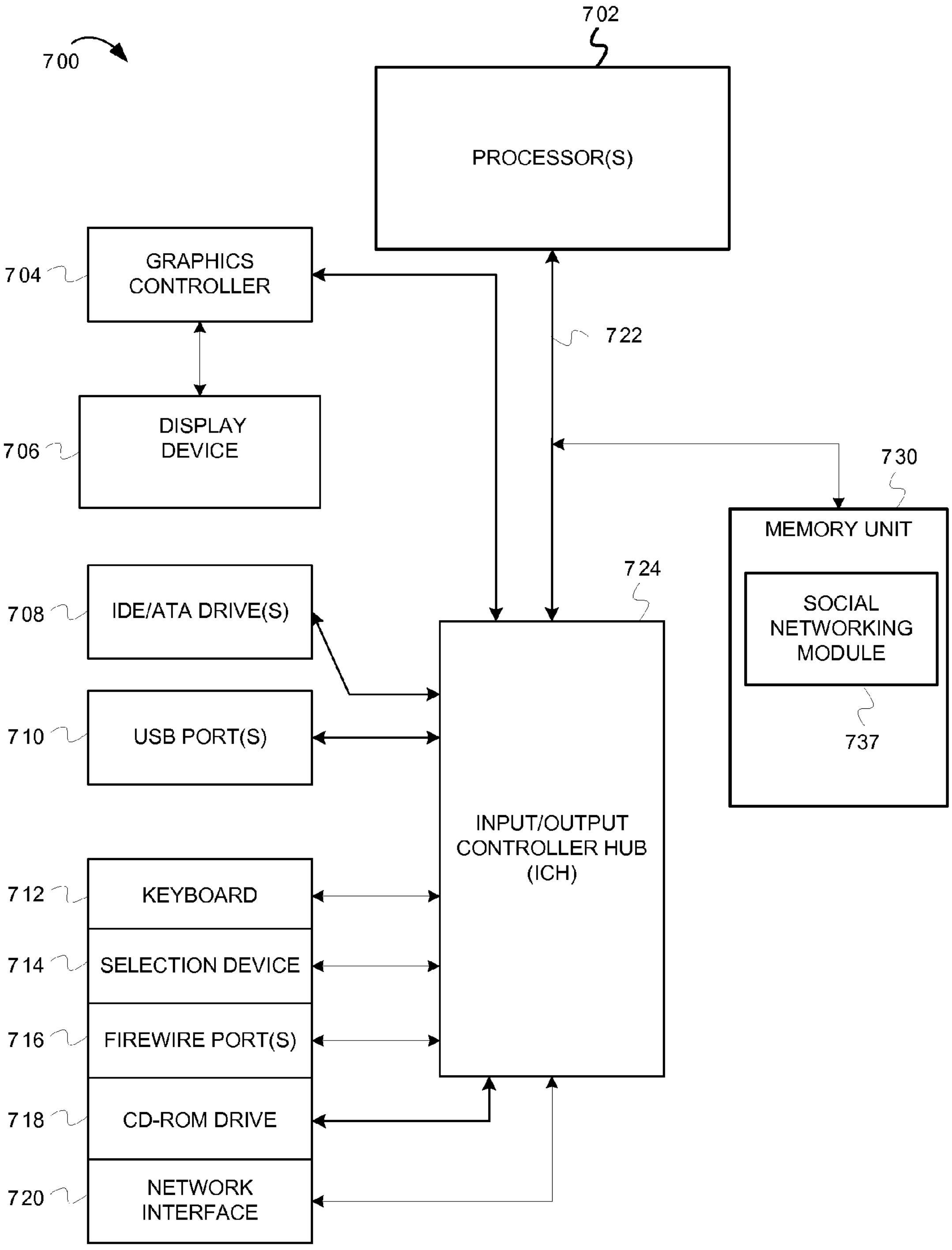
FIG. 7 is an illustration of a computer system 700, according to some embodiments.

FIG. 7 is a conceptual diagram that illustrates an example of a computer system 700, according to some embodiments. In FIG. 7, the computer system 700 may include a processor unit 702, a memory unit 730, a processor bus 722, and an Input/Output controller hub (ICH) 724. The processor unit 702, memory unit 730, and ICH 724 may be coupled to the processor bus 722. The processor unit 702 may comprise any suitable processor architecture. The computer system 700 may comprise one, two, three, or more processors, any of which may execute a set of instructions in accordance with some embodiments.

The memory unit 730 may also include an I/O scheduling policy unit 7 and I/O schedulers 7. The memory unit 730 can store data and/or instructions, and may comprise any suitable memory, such as a dynamic random access memory (DRAM), for example. The computer system 700 may also include one or more suitable integrated drive electronics (IDE) drive(s) 708 and/or other suitable storage devices. A graphics controller 704 controls the display of information on a display device 706, according to some embodiments.

The input/output controller hub (ICH) 724 provides an interface to I/O devices or peripheral components for the computer system 700. The ICH 724 may comprise any suitable interface controller to provide for any suitable communication link to the processor unit 702, memory unit 730 and/or to any suitable device or component in communication with the ICH 724. The ICH 724 can provide suitable arbitration and buffering for each interface.

For one embodiment, the ICH 724 provides an interface to the one or more IDE drives 708, such as a hard disk drive (HDD) or compact disc read only memory (CD ROM) drive, or to suitable universal serial bus (USB) devices through one or more USB ports 710. For one embodiment, the ICH 724 also provides an interface to a keyboard 712, selection device 714 (e.g., a mouse, trackball, touchpad, etc.), CD-ROM drive 718, and one or more suitable devices through one or more firewire ports 716. For one embodiment, the ICH 724 also provides a network interface 720 though which the computer system 700 can communicate with other computers and/or devices.

The computer system 700 may also include a machine-readable medium that stores a set of instructions (e.g., software) embodying any one, or all, of the methodologies for controlling wagering game play continuation. Furthermore, software can reside, completely or at least partially, within the memory unit 730 and/or within the processor unit 702. The computer system 700 can also include a wagering game module 737. The wagering game module 737 can process communications, commands, or other information, to control wagering game play continuation. Any component of the computer system 700 can be implemented as hardware, firmware, and/or machine-readable media including instructions for performing the operations described herein.

Personal Wagering Game System

Figure 8:
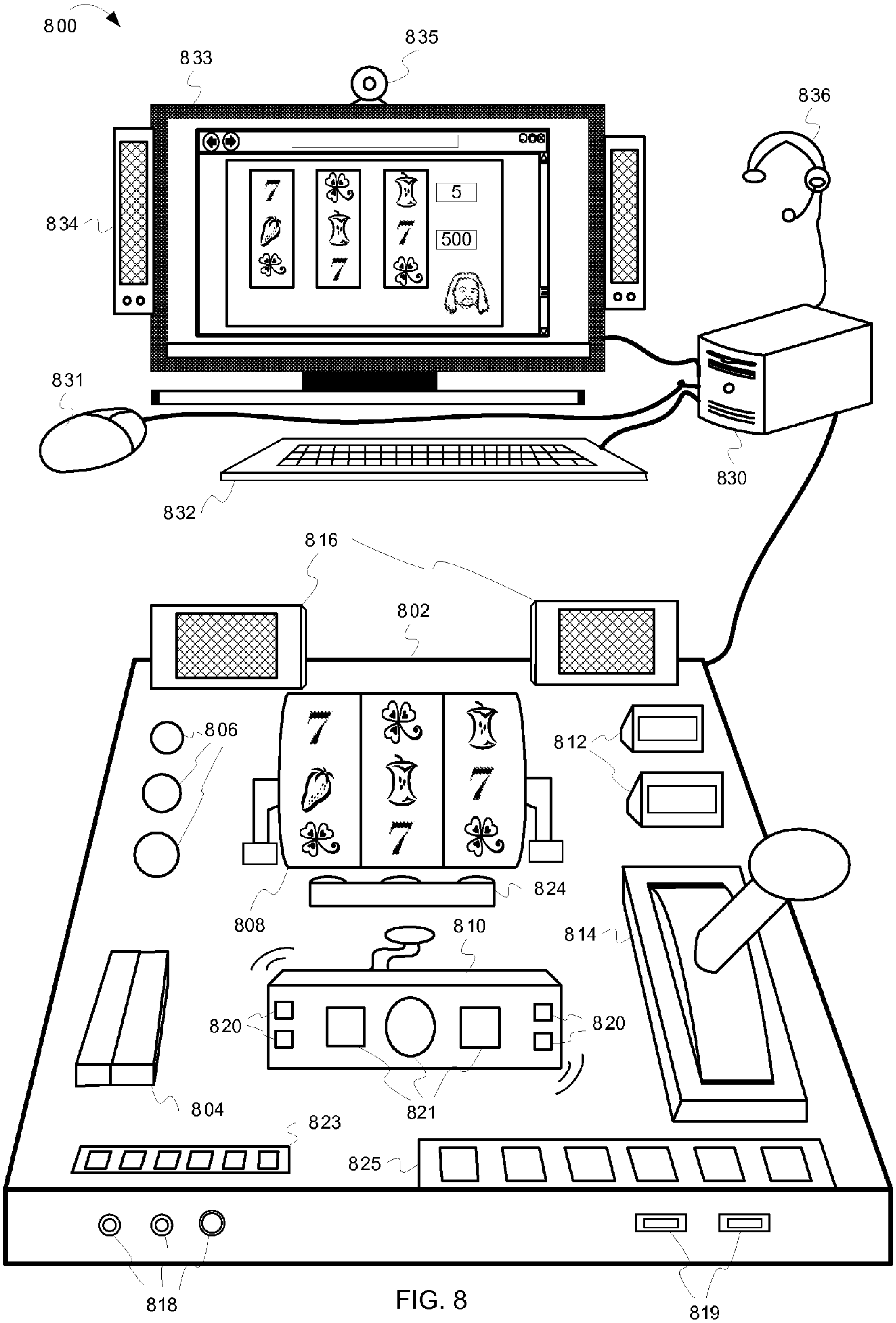
FIG. 8 is an illustration of a personal wagering game system 800, according to some embodiments.

FIG. 8 is a conceptual diagram that illustrates an example of a personal wagering game system 800, according to some embodiments. In FIG. 8, the personal wagering game system ("system") 800 includes an exemplary computer system 830 connected to several devices, including user input devices (e.g., a keyboard 832, a mouse 831), a web-cam 835, a monitor 833, speakers 834, and a headset 836 that includes a microphone and a listening device. In some embodiments, the webcam 835 can detect fine details of a person's facial features, from an eye-level perspective. The web-cam 835 can use the fine detail to determine a person's identity, their demeanor, their facial expressions, their mood, their activities, their eye focus, etc. The headset 836 can include biometric sensors configured to detect voice patterns, spoken languages, spoken commands, etc. The biometric sensors in the web-cam 835 can detect colors (e.g., skin colors, eye colors, hair colors, clothing colors, etc.) and textures (e.g., clothing material, scars, etc.). The biometric sensors in the web-cam 835 can also measure distances between facial features (e.g., distance between eyes, distance from eyes to nose, distance from nose to lips, length of lips, etc.). The system 800 can generate a facial and body map using the detected colors, textures, and facial measurements. The system 800 can use the facial and body map to generate similar facial features and body appearances for a player account avatar. Also connected to the computer system 830 is a gaming control device ("gaming pad") 802 including wagering game accoutrements associated with wagering games. The wagering game accoutrements include one or more of prop reels 808, prop game meters 812, indicators 806, a game control device 810, a physical lever 814, a magnetic card reader 804, a video projection device 824, input/output ports 818, USB ports 819, and speakers 816. The gaming pad 802 can present feedback of online activities. For instance, the gaming pad 802 can use vibrations and signals on the gaming control device (e.g., the game control device 810 or the physical level 814 can vibrate to indicate a back pat from another player or a game celebration, the indicators 806 can blink, etc.). The physical lever 814 can produce feelings in the lever to emulate a pulling feel or a vibration. The video projection device 824 can project video onto the props reels 808 so that the prop reels 808 can present many different types of wagering games. The prop reels 808 can spin when the physical lever 814 is pulled. The video projection device 824 can project reel icons onto the prop reels 808 as they spin. The video projection device 824 can also project reel icons onto the prop reels 808 when the prop reels 808 are stationary, but the imagery from the video project device 824 makes the prop reels 808 appear to spin. The magnetic card reader 804 can be used to swipe a credit card, a player card, or other cards, so that the system can quickly get information. The system 800 can offer lower rates for using the magnetic card reader 804 (e.g., to get a lower rate per transaction). The game control device 810 can include an emotion indicator keypad with keys 820 that a player can use to indicate emotions. The game control device 810 can also include biometric devices 821 such as a heart-rate monitor, an eye pupil dilation detector, a fingerprint scanner, a retinal scanner, voice detectors, speech recognition microphones, motion sensors, sound detectors, etc. The biometric devices 821 can be located in other places, such as in the headset 836, within a chair (not shown), within personal control devices (e.g. joysticks, remote controls, game pads, roller-balls, touch-pads, touch-screens, etc.), within the web-cam 835, or any other external device. The external devices can be connected to the computer 830 or to the game control device 810 via the input/output ports 818. As a security feature, some biometric devices can be associated with some of the gaming pad devices (e.g., the magnetic card reader 804), such as a fingerprint scanner, a retinal scanner, a signature pad to recognize a player's signature, etc. The game control device 810 can also use the keys 820 to share items and control avatars, icons, game activity, movement, etc. within a network wagering venue. The game pad can also have an electronic (e.g., digital) button panel 825, an electronic control panel 823, or any other type of changeable panel that can change appearance and/or configuration based on the game being played, the action being performed, and/or other activity presented within an online gaming venue. The game control device 810 can also move in different directions to control activity within the online gaming venue (e.g., movement of a player's avatar moves in response to the movements of the game control device 810). Avatars can be pre-programmed to act and look in certain ways, which the player can control using the system 800. The gaming pad

802 can permit the player to move the avatar fluidly and more easily than is possible using a standard keyboard. The system 800 can cause an avatar to respond to input that a player receives via the gaming pad 802. For example, a player may hear a sound that comes primarily from one direction (e.g., via stereophonic signals in the headset 836) within the network wagering venue. The system 800 can detect the movement of the player (e.g., the system 800 detects that a player moves his head to look in the direction of the sound, the player uses the game control device 810 to move the avatar's perspective to the direction of the sound, etc.). The system 800 can consequently move the avatar's head and/or the avatar's perspective in response to the player's movement. The player can indicate an expression of an emotion indicated by the player using the keys 820. The system 800 can make the avatar's appearance change to reflect the indicated emotion. The system 800 can respond to other movements or actions by the player and fluidly move the avatar to respond. The system 800 can also interpret data provided by the biometric devices and determine expressions and/or indications of emotions for a player using the system 800.

Wagering Game Machine Architecture

Figure 9:
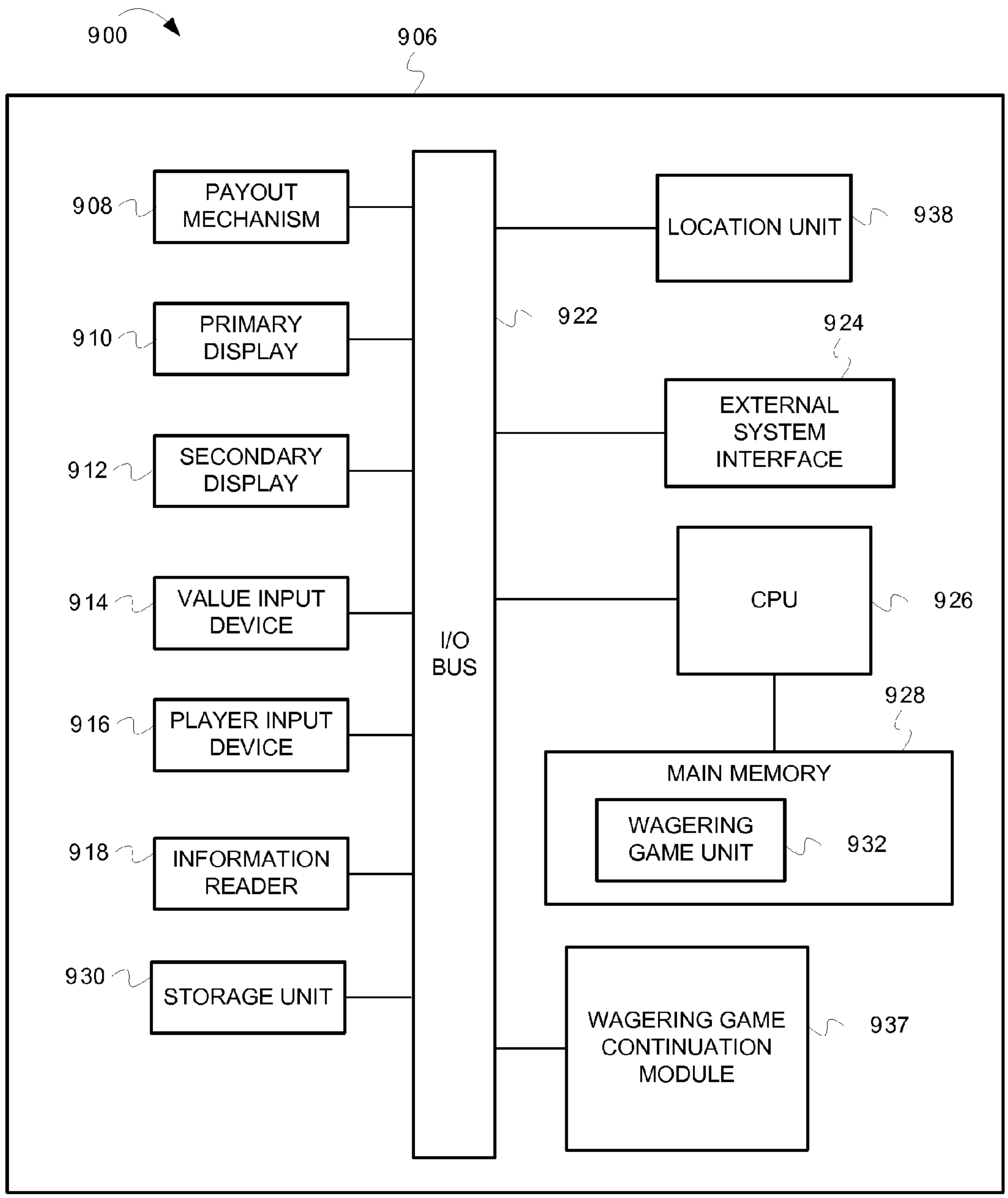
FIG. 9 is an illustration of a wagering game machine architecture 900, according to some embodiments.

FIG. 9 is a conceptual diagram that illustrates an example of a wagering game machine architecture 900, according to some embodiments. In FIG. 9, the wagering game machine architecture 900 includes a wagering game machine 906, which includes a central processing unit (CPU) 926 connected to main memory 928. The CPU 926 can include any suitable processor, such as an Intel® Pentium processor, Intel® Core 2 Duo processor, AMD Opteron™ processor, or UltraSPARC processor. The main memory 928 includes a wagering game unit 932. In some embodiments, the wagering game unit 932 can present wagering games, such as video poker, video black jack, video slots, video lottery, reel slots, etc., in whole or part.

The CPU 926 is also connected to an input/output ("I/O") bus 922, which can include any suitable bus technologies, such as an AGTL+frontside bus and a PCI backside bus. The I/O bus 922 is connected to a payout mechanism 908, primary display 910, secondary display 912, value input device 914, player input device 916, information reader 918, and storage unit 930. The player input device 916 can include the value input device 914 to the extent the player input device 916 is used to place wagers. The I/O bus 922 is also connected to an external system interface 924, which is connected to external systems (e.g., wagering game networks). The external system interface 924 can include logic for exchanging information over wired and wireless networks (e.g., 802.11g transceiver, Bluetooth transceiver, Ethernet transceiver, etc.)

The I/O bus 922 is also connected to a location unit 938. The location unit 938 can create player information that indicates the wagering game machine's location/movements in a casino. In some embodiments, the location unit 938 includes a global positioning system (GPS) receiver that can determine the wagering game machine's location using GPS satellites. In other embodiments, the location unit 938 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 9, in some embodiments, the location unit 938 is not connected to the I/O bus 922.

In some embodiments, the wagering game machine 906 can include additional peripheral devices and/or more than one of each component shown in FIG. 9. For example, in some embodiments, the wagering game machine 906 can include multiple external system interfaces 924 and/or multiple CPUs 926. In some embodiments, any of the components can be integrated or subdivided.

In some embodiments, the wagering game machine 906 includes a game continuation module 937. The game continuation module 937 can process communications, commands, or other information, where the processing can control wagering game play continuation.

Furthermore, any component of the wagering game machine 906 can include hardware, firmware, and/or machine-readable media including instructions for performing the operations described herein.

Wagering Game Machine

Figure 10:
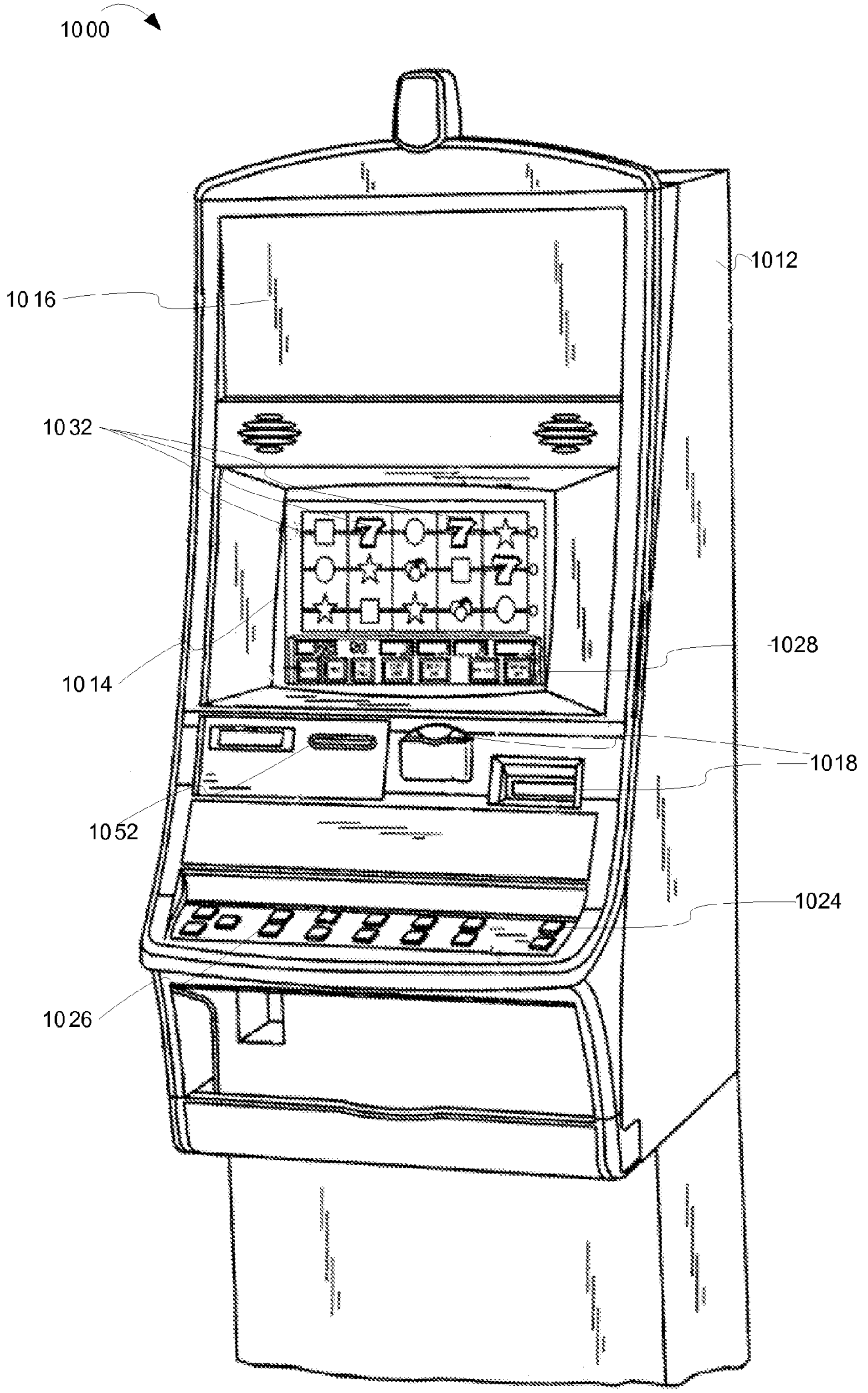
FIG. 10 is an illustration of a wagering game machine 1000, according to some embodiments.

FIG. 10 is a conceptual diagram that illustrates an example of a wagering game machine 1000, according to some embodiments. Referring to FIG. 10, the wagering game machine 1000 can be used in gaming establishments, such as casinos. According to some embodiments, the wagering game machine 1000 can be any type of wagering game machine and can have varying structures and methods of operation. For example, the wagering game machine 1000 can be an electromechanical wagering game machine configured to play mechanical slots, or it can be an electronic wagering game machine configured to play video casino games, such as blackjack, slots, keno, poker, blackjack, roulette, etc.

The wagering game machine 1000 comprises a housing 1012 and includes input devices, including value input devices 1018 and a player input device 1024. For output, the wagering game machine 1000 includes a primary display 1014 for displaying information about a basic wagering game. The primary display 1014 can also display information about a bonus wagering game and a progressive wagering game. The wagering game machine 1000 also includes a secondary display 1016 for displaying wagering game events, wagering game outcomes, and/or signage information. While some components of the wagering game machine 1000 are described herein, numerous other elements can exist and can be used in any number or combination to create varying forms of the wagering game machine 1000.

The value input devices 1018 can take any suitable form and can be located on the front of the housing 1012. The value input devices 1018 can receive currency and/or credits inserted by a player. The value input devices 1018 can include coin acceptors for receiving coin currency and bill acceptors for receiving paper currency. Furthermore, the value input devices 1018 can include ticket readers or barcode scanners for reading information stored on vouchers, cards, or other tangible portable storage devices. The vouchers or cards can authorize access to central accounts, which can transfer money to the wagering game machine 1000.

The player input device 1024 comprises a plurality of push buttons on a button panel 1026 for operating the wagering game machine 1000. In addition, or alternatively, the player input device 1024 can comprise a touch screen 1028 mounted over the primary display 1014 and/or secondary display 1016.

The various components of the wagering game machine 1000 can be connected directly to, or contained within, the housing 1012. Alternatively, some of the wagering game machine's components can be located outside of the housing 1012, while being communicatively coupled with the wagering game machine 1000 using any suitable wired or wireless communication technology.

The operation of the basic wagering game can be displayed to the player on the primary display 1014. The primary display 1014 can also display a bonus game associated with the basic wagering game. The primary display 1014 can include a cathode ray tube (CRT), a high resolution liquid crystal display (LCD), a plasma display, light emitting diodes (LEDs), or any other type of display suitable for use in the wagering game machine 1000. Alternatively, the primary display 1014 can include a number of mechanical reels to display the outcome. In FIG. 10, the wagering game machine 1000 is an "upright" version in which the primary display 1014 is oriented vertically relative to the player. Alternatively, the wagering game machine can be a "slant-top" version in which the primary display 1014 is slanted at about a thirty-degree angle toward the player of the wagering game machine 1000. In yet another embodiment, the wagering game machine 1000 can exhibit any suitable form factor, such as a free standing model, bar top model, mobile handheld model, or workstation console model.

A player begins playing a basic wagering game by making a wager via the value input device 1018. The player can initiate play by using the player input device's buttons or touch screen 1028. The basic game can include arranging a plurality of symbols along a pay line 1032, which indicates one or more outcomes of the basic game. Such outcomes can be randomly selected in response to player input. At least one of the outcomes, which can include any variation or combination of symbols, can trigger a bonus game.

In some embodiments, the wagering game machine 1000 can also include an information reader 1052, which can include a card reader, ticket reader, bar code scanner, RFID transceiver, or computer readable storage medium interface. In some embodiments, the information reader 1052 can be used to award complimentary services, restore game assets, track player habits, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:

determining, via one or more processors, that a wagering game played by a player during a wagering game session constitutes a near win, the wagering game session including play of at least two wagering games;

recording, in response to determining the wagering game constitutes a near win, first wagering game content from the wagering game, wherein the first wagering game content allows for recreation of a near-win opportunity based on the near win;

generating an electronic message configured to be sent to the player, the generating occurring a predetermined period of time after the wagering game session ends;

embedding in the electronic message an object that provides access to second wagering game content, wherein the second wagering game content includes an indication of the first wagering game content;

sending the electronic message to an electronic address for a wagering game player account associated with the player; and detecting, via the object embedded in the electronic message, access to the second wagering game content by the player, wherein the second wagering game content allows re-play of the near-win opportunity by the player.

2. The computer-implemented method of claim 1, wherein the object that provides access to the second wagering game content is a link, and wherein the detecting the access to the second wagering game content, via the object embedded in the electronic message, comprises:

detecting a selection of the link;

launching an instance of a web browser in response to the detecting the selection; and presenting the second wagering game content in the instance of the web browser.

3. The computer-implemented method of claim 1, wherein the recording the first wagering game content comprises:

presenting a first value on one or more first wagering game elements during the wagering game according to a randomly generated number, wherein the first value reveals a first part of a wagering game outcome in the wagering game;

presenting a second value on one or more second wagering game elements during the wagering game, wherein the second value reveals a second part of the wagering game outcome, and wherein the first value combined with the second value collectively present a losing wagering game outcome; and recording an image of the first value.

4. The computer-implemented method of claim 3, wherein the embedding in the electronic message the object that provides the access to the second wagering game content, includes generating a wagering game animation that includes the image of the first value, an instance of the one or more second wagering game elements, and a control to activate a replaying of the second part of the wagering game outcome on the instance of the one or more second wagering game elements using an additional randomly generated number, and embedding the wagering game animation within a body of the electronic message.

5. The computer-implemented method of claim 4, wherein the detecting the access to the second wagering game content, via the object embedded in the electronic message comprises detecting access to the electronic message via a client device that is configured to present the wagering game animation in the electronic message, and detecting activation of the control by user input via the client device.

6. The computer-implemented method of claim 5 further comprising:

detecting presentation of a third value, based on the additional randomly generated number, wherein the presentation of the third value is on the instance of the one or more second wagering game elements during a second wagering game; and detecting that the third value, combined with the first value, collectively present a winning wagering game outcome.

7. The computer-implemented method of claim 1, wherein recording the first wagering game content comprises, presenting slot reels with face values that align in a sequence along a payline to reveal a wagering game outcome for the wagering game according to a first randomly generated number, wherein the face values include a first value on a first part of the slot reels to begin the sequence and a second value on a second part of the slot reels to end the sequence, determining that the first value would, if combined with a specific face value for the second value, result in a winning slot-reel-sequence configuration, determining that the second value is not the specific face value, capturing a representation of the first value, and generating the second wagering game content to include the representation of the first value, a representation of the second part of the slot reels without the second value, and a control to spin only the representation of the second part of the slot reels to generate a third value according to a second randomly generated number.

8. The computer-implemented method of claim 1, further comprising:

embedding one or more betting controls within the electronic message;

detecting a wager amount via the one or more betting controls for the second wagering game content; and transacting a wager using the wager amount.

9. One or more non-transitory machine-readable storage media having instructions stored thereon, which when executed by a set of one or more processors causes the set of one or more processors to perform operations comprising:

detecting a presentation of a first wagering game outcome for a wagering game played by a player during a wagering game session, wherein the presentation of the first wagering game outcome includes a first wagering game element and a second wagering game element, wherein the first wagering game element depicts a first outcome value, and wherein the second wagering game element depicts a second outcome value;

determining that the first wagering game outcome for the wagering game constitutes a near win;

determining that the wagering game session ends, the wagering game session including play of at least two wagering games;

determining, in response to the determining that the wagering game session ends, that a predetermined period of time has passed after the wagering game session ends;

creating, in response to determining the first wagering game outcome constitutes a near win, wagering game content, wherein the wagering game content includes a depiction of the first outcome value, wherein the wagering game content also includes a third wagering game element, and wherein the third wagering game element can be activated for play in the wagering game content;

embedding the wagering game content in an electronic mail message;

sending the electronic mail message, after the predetermined period of time, to an electronic address for a wagering game player account associated with the player;

detecting, via user input from the electronic mail message, activation of the third wagering game element for play, wherein activation of the third wagering game element allows for re-play of a near-win opportunity by the player based on the near win;

generating a third outcome value in response to the activation of the third wagering game element, wherein the third outcome value is different from the second outcome value;

providing the third outcome value to the wagering game content to present on the third wagering game element; and generating a second wagering game outcome for the wagering game content using the first outcome value and the third outcome value.

10. The one or more non-transitory machine-readable storage media of claim 9, wherein the third wagering game element is a playable animation embedded within a body of the electronic mail message, wherein the animation initially presents a depiction of the second outcome value on the third wagering game element, and wherein the animation subsequently replaces the depiction of the second outcome value with a depiction of the third outcome value.

11. The one or more non-transitory machine-readable storage media of claim 9, said operations further comprising:

determining that the second wagering game outcome is a winning outcome for the wagering game content according to wagering game rules;

requesting an online retailer to fund an award in response to the determining that the second wagering game outcome is the winning outcome, wherein the award is redeemable at a webpage for the online retailer;

generating a link to the webpage;

including the link in the wagering game content;

detecting selection of the link via the wagering game content; and providing access to the webpage, via a web browser, in response to the detecting the selection of the link.

12. The one or more non-transitory machine-readable storage media of claim 9, wherein the electronic address is for a social contact of a wagering game player account associated with the wagering game session.

13. The one or more non-transitory machine-readable storage media of claim 9, wherein the operation for creating the wagering game content further includes operations comprising:

including a betting control within the wagering game content;

detecting an additional wager via the betting control; and transacting the wager in response to the detecting the activation of the third wagering game element.

14. The one or more non-transitory machine-readable storage media of claim 9, wherein the first wagering game outcome is based on a first randomly generated number and wherein the operation for generating the third outcome value includes operations further comprising generating the third outcome value using a second randomly generated number.

15. A system comprising:

a continuation event detection module configured to detect, during a wagering game played during a wagering game session, a point from which to present a bonus game, via an electronic mail communication, after a wagering game session ends, wherein the bonus game includes a portion of the wagering game session to be re-played, embed content in an electronic mail message, wherein the content is configured to present the bonus game, and send the electronic mail message, after the wagering game session ends, to an electronic mail address associated with a wagering game player account that played the wagering game during the wagering game session;

a wagering game continuation module configured to present the electronic mail message in an electronic mail client application, present the bonus game via the content, and present a winning result for the bonus game; and a marketing services module configured to determine that the bonus game obtains the winning result, determine a reward, present an indication of the reward via the content, present marketing content in the electronic mail message for a subscriber account associated with the marketing services module, determine an award offered by the subscriber account, and provide the award as the reward.

16. The system of claim 15, wherein the wagering game continuation module is further configured to detect a selection of a social contact object associated with the electronic mail client application, wherein the social contact object represents a social contact of the wagering game player account, and forward the electronic mail message to a second electronic mail address associated with the social contact object, and wherein the marketing services module is further configured to detect use of the content by an additional wagering game player account associated with the second electronic mail address, and reward the wagering game player account with a compensation for use of the content.

17. The system of claim 15, wherein the wagering game continuation module is further configured to organize, automatically, the electronic mail message into electronic mail folders based on a game type for the wagering game.

18. An apparatus comprising:

means for receiving an electronic message that includes wagering game content that represents a previously played wagering game of a wagering game session, the wagering game session including at least two wagering games, wherein the previously played wagering game was played by a player, and wherein the previously played wagering game constitutes a near win, the electronic message being generated in response to determining that the previously played wagering game constitutes a near win, and the electronic message being received a predetermined period of time after the wagering game session has ended;

means for selecting the wagering game content from the electronic message;

means for transferring the wagering game content from the electronic message to a wagering game toolbar in a web browser;

means for controlling additional wagering game elements on the wagering game toolbar to allow the player to re-play a near-win opportunity based on the near win;

means for detecting that the additional wagering game elements of the re-play of the near-win opportunity indicate a winning result; and means for providing an award to a wagering game player account associated with the player.

19. The apparatus of claim 18, wherein the near-win opportunity based on the near win includes the wagering game content immediately before a losing result occurred in the previously played wagering game, and wherein the means for transferring the wagering game content from the electronic message to the wagering game toolbar in the web browser further comprises means for presenting the additional wagering game elements as they appeared in the previously played wagering game immediately before the losing result.

20. The apparatus of claim 19, wherein the means for controlling the additional wagering game elements on the wagering game toolbar further comprises:

means for receiving instructions to control the additional wagering game elements based on randomly generated numbers from a wagering game server; and means for changing the appearance of the additional wagering game elements on the wagering game toolbar based on the instructions.

21. The apparatus of claim 18, wherein the means for transferring the wagering game content from the electronic message to the wagering game toolbar in the web browser further comprises means for dragging and dropping a representation of the electronic message onto the wagering game toolbar.

* * * * *